(12) United States Patent
Wigand

(10) Patent No.: US 8,851,177 B2
(45) Date of Patent: ***Oct. 7, 2014

(54) IN-SITU KEROGEN CONVERSION AND OXIDANT REGENERATION

(75) Inventor: Marcus Oliver Wigand, San Ramon, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 313 days.

This patent is subject to a terminal disclaimer.

(21) Appl. No.: 13/335,864

(22) Filed: Dec. 22, 2011

(65) Prior Publication Data

US 2013/0161002 A1    Jun. 27, 2013

(51) Int. Cl.
*E21B 43/27* (2006.01)

(52) U.S. Cl.
USPC ........ 166/307; 166/271; 166/272.6; 166/300; 166/369

(58) Field of Classification Search
None
See application file for complete search history.

(56) References Cited

U.S. PATENT DOCUMENTS

| | | | |
|---|---|---|---|
| 1,269,747 A | 6/1918 | Lebbeus et al. |
| 2,969,226 A | 1/1961 | Huntington |
| 3,001,775 A | 9/1961 | Allred |
| 3,001,776 A | 9/1961 | Poollen et al. |
| 3,017,168 A | 1/1962 | Carr |
| 3,061,009 A | 10/1962 | Shirley |
| 3,076,762 A | 2/1963 | Dill |
| 3,127,935 A | 4/1964 | Poettmann et al. |
| 3,136,361 A | 6/1964 | Marx |
| 3,139,928 A | 7/1964 | Broussard |
| 3,205,942 A | 9/1965 | Sandberg |
| 3,223,158 A | 12/1965 | Baker |
| 3,228,468 A | 1/1966 | Nichols |
| 3,241,611 A | 3/1966 | Dougan |
| 3,280,910 A | 10/1966 | Crider |
| 3,285,335 A | 11/1966 | Reistle, Jr. |
| 3,292,699 A | 12/1966 | Slusser et al. |
| 3,322,194 A | 5/1967 | Strubhar |
| 3,342,258 A | 9/1967 | Prats |
| 3,342,261 A | 9/1967 | Bond |
| 3,346,044 A | 10/1967 | Slusser |
| 3,349,848 A | 10/1967 | Burgh |

(Continued)

FOREIGN PATENT DOCUMENTS

| | | |
|---|---|---|
| WO | WO2005010320 A1 | 2/2005 |
| WO | WO2011007172 A2 | 1/2011 |

OTHER PUBLICATIONS

U.S. Appl. No. 13/335,409, filed Dec. 22, 2011, entitled "In-Situ Kerogen Conversion and Recovery".

(Continued)

*Primary Examiner* — Zakiya W Bates

(57) ABSTRACT

The invention relates to methods for extracting a kerogen-based product from subsurface shale formations. The methods utilize in-situ reactions of kerogen involving liquid phase chemistry at formation temperatures and pressures. These methods rely on chemically modifying the shale-bound kerogen to render it mobile, using chemical oxidants. In one embodiment, an oxidant is provided to the subsurface shale formation comprising kerogen in an inorganic matrix, the oxidant converting the kerogen to form organic acids, and forming a mobile kerogen-based product. The spent oxidant is regenerated in-situ to restore at least some of the original oxidation activity. At least a portion of the mobile kerogen-based product is recovered. The kerogen-derived product can be upgraded to provide commercial products.

35 Claims, 4 Drawing Sheets

(56) References Cited

U.S. PATENT DOCUMENTS

| | | |
|---|---|---|
| 3,358,756 A | 12/1967 | Vogel |
| 3,362,471 A | 1/1968 | Slusser et al. |
| 3,382,922 A | 5/1968 | Needham |
| 3,398,793 A | 8/1968 | Milton, Jr. |
| 3,400,762 A | 9/1968 | Peacock et al. |
| 3,434,757 A | 3/1969 | Prats |
| 3,437,378 A | 4/1969 | Smith |
| 3,442,789 A | 5/1969 | Zimmerman, Jr. |
| 3,455,383 A | 7/1969 | Prats et al. |
| 3,468,376 A | 9/1969 | Bramhall et al. |
| 3,474,863 A | 10/1969 | Deans et al. |
| 3,478,825 A | 11/1969 | Closmann |
| 3,480,082 A | 11/1969 | Gilliland |
| 3,481,398 A | 12/1969 | Prats |
| 3,489,672 A | 1/1970 | Schuman |
| 3,499,490 A | 3/1970 | Needham et al. |
| 3,500,913 A | 3/1970 | Closmann et al. |
| 3,502,372 A | 3/1970 | Prats |
| 3,503,868 A | 3/1970 | Shields |
| 3,504,747 A | 4/1970 | Fitch et al. |
| 3,513,913 A | 5/1970 | Bruist |
| 3,515,213 A | 6/1970 | Prats |
| 3,521,709 A | 7/1970 | Needham |
| 3,537,528 A | 11/1970 | O'Brien et al. |
| 3,548,938 A | 12/1970 | Parker |
| 3,554,283 A | 1/1971 | Abrams |
| 3,561,532 A | 2/1971 | Roberts et al. |
| 3,565,171 A | 2/1971 | Closmann |
| 3,578,080 A | 5/1971 | Closmann |
| 3,593,789 A | 7/1971 | Prats |
| 3,593,790 A | 7/1971 | Herce |
| 3,601,193 A | 8/1971 | Grady |
| 3,661,423 A | 5/1972 | Garret |
| 3,666,014 A | 5/1972 | Beard |
| 3,700,280 A | 10/1972 | Papadopoulos et al. |
| 3,739,851 A * | 6/1973 | Beard ........................ 166/254.1 |
| 3,766,982 A | 10/1973 | Justheim |
| 3,779,601 A | 12/1973 | Beard |
| 3,804,169 A | 4/1974 | Closmann |
| 3,804,172 A | 4/1974 | Closmann et al. |
| 3,882,941 A | 5/1975 | Pelofsky |
| 3,950,029 A | 4/1976 | Timmins |
| 3,994,343 A | 11/1976 | Cha et al. |
| 4,005,752 A | 2/1977 | Cha |
| 4,008,761 A | 2/1977 | Fisher et al. |
| 4,008,762 A | 2/1977 | Fisher et al. |
| 4,018,280 A | 4/1977 | Daviduk et al. |
| 4,026,360 A | 5/1977 | Drinkard |
| 4,027,731 A | 6/1977 | Smith et al. |
| 4,027,917 A | 6/1977 | Bartel et al. |
| 4,029,360 A | 6/1977 | French |
| 4,036,299 A | 7/1977 | Cha et al. |
| 4,061,190 A | 12/1977 | Bloomfield |
| 4,065,183 A | 12/1977 | Hill et al. |
| 4,067,390 A | 1/1978 | Camacho et al. |
| 4,072,350 A | 2/1978 | Bartel et al. |
| 4,076,312 A | 2/1978 | Cha et al. |
| 4,082,145 A | 4/1978 | Elkington |
| 4,082,146 A | 4/1978 | Compton et al. |
| 4,083,604 A | 4/1978 | Bohn et al. |
| 4,084,640 A | 4/1978 | Allred |
| 4,091,869 A | 5/1978 | Hoyer |
| 4,105,072 A | 8/1978 | Cha |
| 4,108,760 A | 8/1978 | Williams et al. |
| 4,109,718 A | 8/1978 | Burton |
| 4,126,180 A | 11/1978 | Cha |
| 4,130,474 A | 12/1978 | Anthony |
| 4,140,180 A | 2/1979 | Bridges et al. |
| 4,144,935 A | 3/1979 | Bridges et al. |
| 4,147,388 A | 4/1979 | French |
| 4,147,389 A | 4/1979 | Bartel et al. |
| 4,148,358 A | 4/1979 | Compton |
| 4,148,359 A | 4/1979 | Laumbach et al. |
| 4,151,068 A | 4/1979 | McCollum et al. |
| 4,156,461 A | 5/1979 | Cha |
| 4,158,467 A | 6/1979 | Larson et al. |
| 4,162,808 A | 7/1979 | Kvapil et al. |
| 4,166,721 A | 9/1979 | Cha |
| 4,167,291 A | 9/1979 | Ridley |
| 4,169,506 A | 10/1979 | Berry |
| 4,176,882 A | 12/1979 | Studebaker et al. |
| 4,181,177 A | 1/1980 | Compton |
| 4,184,547 A | 1/1980 | Klass et al. |
| 4,189,376 A | 2/1980 | Mitchell |
| 4,191,251 A | 3/1980 | Cha |
| 4,192,381 A | 3/1980 | Cha |
| 4,192,552 A | 3/1980 | Cha |
| 4,193,451 A | 3/1980 | Dauphine |
| 4,202,412 A | 5/1980 | Ruskin |
| 4,218,309 A | 8/1980 | Compton |
| 4,227,574 A | 10/1980 | Cha |
| 4,239,283 A | 12/1980 | Ridley |
| 4,239,284 A | 12/1980 | Ridley et al. |
| 4,243,100 A | 1/1981 | Cha |
| 4,246,965 A | 1/1981 | Cha |
| 4,265,307 A | 5/1981 | Elkins |
| RE30,738 E | 9/1981 | Bridges et al. |
| 4,324,292 A | 4/1982 | Jacobs et al. |
| 4,328,863 A | 5/1982 | Berry |
| 4,359,246 A | 11/1982 | Ricketts |
| 4,366,986 A | 1/1983 | Bohn et al. |
| 4,374,545 A | 2/1983 | Bullen et al. |
| 4,376,034 A | 3/1983 | Wall |
| 4,378,949 A | 4/1983 | Miller |
| 4,379,591 A | 4/1983 | Tassoney |
| 4,379,593 A | 4/1983 | Weichman |
| 4,384,614 A | 5/1983 | Justheim |
| 4,389,300 A | 6/1983 | Mitchell |
| 4,396,491 A | 8/1983 | Stiller et al. |
| 4,401,162 A | 8/1983 | Osborne |
| 4,401,163 A | 8/1983 | Elkins |
| 4,401,551 A | 8/1983 | Mitchell |
| 4,408,665 A | 10/1983 | Dougan |
| 4,423,907 A | 1/1984 | Ridley |
| 4,424,121 A | 1/1984 | Choi et al. |
| 4,425,220 A | 1/1984 | Kestner |
| 4,425,967 A | 1/1984 | Hoekstra |
| 4,435,016 A | 3/1984 | Wissenberg et al. |
| 4,436,344 A | 3/1984 | Forgac et al. |
| 4,437,519 A | 3/1984 | Cha et al. |
| 4,441,985 A | 4/1984 | Burchfield et al. |
| 4,444,258 A | 4/1984 | Kalmar |
| 4,449,586 A | 5/1984 | Urban et al. |
| 4,452,689 A | 6/1984 | Russum |
| 4,454,915 A | 6/1984 | York et al. |
| 4,457,365 A | 7/1984 | Kasevich et al. |
| 4,457,374 A | 7/1984 | Hoekstra et al. |
| 4,458,757 A | 7/1984 | Bock et al. |
| 4,458,944 A | 7/1984 | Fernandes |
| 4,470,459 A | 9/1984 | Copland |
| 4,481,099 A | 11/1984 | Mitchell |
| 4,483,398 A | 11/1984 | Peters et al. |
| 4,485,869 A | 12/1984 | Sresty et al. |
| 4,487,260 A | 12/1984 | Pittman et al. |
| 4,491,514 A | 1/1985 | Siskin et al. |
| 4,495,056 A | 1/1985 | Venardos et al. |
| 4,502,942 A | 3/1985 | Lee et al. |
| 4,531,783 A | 7/1985 | Ricketts |
| 4,532,991 A | 8/1985 | Hoekstra et al. |
| 4,533,181 A | 8/1985 | Ricketts |
| 4,552,214 A | 11/1985 | Forgac et al. |
| 4,595,056 A | 6/1986 | Zahradnik et al. |
| 4,637,464 A | 1/1987 | Forgac et al. |
| 4,640,352 A | 2/1987 | Vanmeurs et al. |
| 4,691,773 A | 9/1987 | Ward et al. |
| 4,695,373 A | 9/1987 | Ho |
| 4,698,149 A | 10/1987 | Mitchell |
| 4,703,798 A | 11/1987 | Friedman |
| 4,705,108 A | 11/1987 | Little et al. |
| 4,718,439 A | 1/1988 | Gorra et al. |
| 4,737,267 A | 4/1988 | Pao et al. |
| 4,798,668 A | 1/1989 | Ho |
| 4,856,587 A | 8/1989 | Nielson |
| 4,856,589 A | 8/1989 | Kuhlman et al. |

(56) References Cited

U.S. PATENT DOCUMENTS

| | | |
|---|---|---|
| 4,886,118 A | 12/1989 | Van Meurs et al. |
| 4,888,031 A | 12/1989 | Martens |
| 4,895,206 A | 1/1990 | Price |
| 4,926,941 A | 5/1990 | Glandt et al. |
| 5,020,596 A | 6/1991 | Hemsath |
| 5,058,675 A | 10/1991 | Travis |
| 5,060,726 A | 10/1991 | Glandt et al. |
| 5,091,076 A | 2/1992 | So |
| 5,236,039 A | 8/1993 | Edelstein et al. |
| 5,255,742 A | 10/1993 | Mikus |
| 5,297,626 A | 3/1994 | Vinegar et al. |
| 5,338,442 A | 8/1994 | Siskin et al. |
| 5,404,952 A | 4/1995 | Vinegar et al. |
| 5,411,089 A | 5/1995 | Vinegar et al. |
| 5,433,271 A | 7/1995 | Vinegar et al. |
| 5,843,311 A | 12/1998 | Richter et al. |
| 6,056,057 A | 5/2000 | Vinegar et al. |
| 6,079,499 A | 6/2000 | Mikus et al. |
| 6,102,122 A | 8/2000 | de Rouffignac |
| 6,279,653 B1 | 8/2001 | Wegener et al. |
| 6,547,957 B1 | 4/2003 | Sudhakar et al. |
| 6,702,016 B2 | 3/2004 | de Rouffignac et al. |
| 6,715,549 B2 | 4/2004 | Wellington et al. |
| 6,719,047 B2 | 4/2004 | Fowler et al. |
| 6,722,431 B2 | 4/2004 | Karanikas et al. |
| 6,729,395 B2 | 5/2004 | Shahin, Jr. et al. |
| 6,769,483 B2 | 8/2004 | de Rouffignac et al. |
| 6,769,486 B2 | 8/2004 | Lim et al. |
| 6,782,947 B2 | 8/2004 | de Rouffignac et al. |
| 6,877,555 B2 | 4/2005 | Karanikas et al. |
| 6,880,633 B2 | 4/2005 | Wellington et al. |
| 6,889,769 B2 | 5/2005 | Wellington et al. |
| 6,896,053 B2 | 5/2005 | Berchenko et al. |
| 6,902,004 B2 | 6/2005 | de Rouffignac et al. |
| 6,915,850 B2 | 7/2005 | Vinegar et al. |
| 6,918,442 B2 | 7/2005 | Wellington et al. |
| 6,923,257 B2 | 8/2005 | Wellington et al. |
| 6,932,155 B2 | 8/2005 | Vinegar et al. |
| 6,951,247 B2 | 10/2005 | de Rouffignac et al. |
| 6,951,248 B2 | 10/2005 | Conaway et al. |
| 6,953,087 B2 | 10/2005 | de Rouffignac et al. |
| 6,964,300 B2 | 11/2005 | Vinegar et al. |
| 6,991,032 B2 | 1/2006 | Berchenko |
| 6,991,033 B2 | 1/2006 | Wellington et al. |
| 6,991,036 B2 | 1/2006 | Sumnu-Dindoruk et al. |
| 6,994,160 B2 | 2/2006 | Wellington et al. |
| 6,994,169 B2 | 2/2006 | Zhang et al. |
| 6,997,518 B2 | 2/2006 | Vinegar et al. |
| 7,004,251 B2 | 2/2006 | Ward et al. |
| 7,011,154 B2 | 3/2006 | Maher et al. |
| 7,013,972 B2 | 3/2006 | Vinegar et al. |
| 7,032,660 B2 | 4/2006 | Vinegar et al. |
| 7,051,811 B2 | 5/2006 | de Rouffignac et al. |
| 7,055,600 B2 | 6/2006 | Messier et al. |
| 7,073,578 B2 | 7/2006 | Vinegar et al. |
| 7,077,198 B2 | 7/2006 | Vinegar et al. |
| 7,086,465 B2 | 8/2006 | Wellington et al. |
| 7,090,013 B2 | 8/2006 | Wellington |
| 7,091,460 B2 | 8/2006 | Kinzer |
| 7,096,942 B1 | 8/2006 | de Rouffignac et al. |
| 7,100,994 B2 | 9/2006 | Vinegar et al. |
| 7,114,566 B2 | 10/2006 | Vinegar et al. |
| 7,121,342 B2 | 10/2006 | Vinegar et al. |
| 7,344,889 B2 | 3/2008 | Kelemen et al. |
| 7,416,022 B2 | 8/2008 | Maguire |
| 7,441,603 B2 | 10/2008 | Kaminsky et al. |
| 7,484,561 B2 | 2/2009 | Bridges |
| 7,500,517 B2 | 3/2009 | Looney et al. |
| 7,510,000 B2 | 3/2009 | Pastor-Sanz et al. |
| 7,540,324 B2 | 6/2009 | de Rouffignac et al. |
| 7,543,638 B2 | 6/2009 | Goodman |
| 7,549,470 B2 | 6/2009 | Vinegar et al. |
| 7,556,096 B2 | 7/2009 | Vinegar et al. |
| 7,559,368 B2 | 7/2009 | Vinegar et al. |
| 7,562,707 B2 | 7/2009 | Miller |
| 7,584,789 B2 | 9/2009 | Mo et al. |
| 7,604,052 B2 | 10/2009 | Roes et al. |
| 7,631,690 B2 | 12/2009 | Vinegar et al. |
| 7,635,023 B2 | 12/2009 | Goldberg et al. |
| 7,669,657 B2 | 3/2010 | Symington et al. |
| 7,712,528 B2 | 5/2010 | Langdon et al. |
| 7,735,935 B2 | 6/2010 | Vinegar et al. |
| 7,789,164 B2 | 9/2010 | Looney et al. |
| 7,841,407 B2 | 11/2010 | Wellington et al. |
| 7,841,408 B2 | 11/2010 | Vinegar |
| 7,845,411 B2 | 12/2010 | Vinegar et al. |
| 7,849,922 B2 | 12/2010 | Vinegar et al. |
| 7,857,056 B2 | 12/2010 | Kaminsky et al. |
| 7,862,705 B2 | 1/2011 | Dana et al. |
| 7,866,386 B2 | 1/2011 | Beer et al. |
| 7,906,014 B2 | 3/2011 | Dana et al. |
| 7,942,203 B2 | 5/2011 | Vinegar et al. |
| 7,950,453 B2 | 5/2011 | Farmayan et al. |
| 7,967,974 B2 | 6/2011 | Dana et al. |
| 7,980,312 B1 | 7/2011 | Hill et al. |
| 2002/0029882 A1 | 3/2002 | Rouffignac et al. |
| 2002/0033253 A1 | 3/2002 | Rouffignac et al. |
| 2002/0033256 A1 | 3/2002 | Wellington et al. |
| 2002/0033257 A1 | 3/2002 | Shahin, Jr. et al. |
| 2002/0036084 A1 | 3/2002 | Vinegar et al. |
| 2002/0036089 A1 | 3/2002 | Vinegar et al. |
| 2002/0038705 A1 | 4/2002 | Wellington et al. |
| 2002/0038709 A1 | 4/2002 | Wellington et al. |
| 2002/0038710 A1 | 4/2002 | Maher et al. |
| 2002/0038711 A1 | 4/2002 | Rouffignac et al. |
| 2002/0040173 A1 | 4/2002 | Rouffignac et al. |
| 2002/0040778 A1 | 4/2002 | Wellington et al. |
| 2002/0040779 A1 | 4/2002 | Wellington et al. |
| 2002/0040780 A1 | 4/2002 | Wellington et al. |
| 2002/0040781 A1 | 4/2002 | Keedy et al. |
| 2002/0045553 A1 | 4/2002 | Vinegar et al. |
| 2002/0046832 A1 | 4/2002 | Zhang et al. |
| 2002/0046837 A1 | 4/2002 | Wellington et al. |
| 2002/0046838 A1 | 4/2002 | Karanikas et al. |
| 2002/0049360 A1 | 4/2002 | Wellington et al. |
| 2002/0050352 A1 | 5/2002 | Wellington et al. |
| 2002/0050357 A1 | 5/2002 | Wellington et al. |
| 2002/0052297 A1 | 5/2002 | Rouffignac et al. |
| 2002/0053429 A1 | 5/2002 | Stegemeier et al. |
| 2002/0053431 A1 | 5/2002 | Wellington et al. |
| 2002/0053435 A1 | 5/2002 | Vinegar et al. |
| 2002/0056551 A1 | 5/2002 | Wellington et al. |
| 2002/0056552 A1 | 5/2002 | Wellington et al. |
| 2002/0057905 A1 | 5/2002 | Wellington et al. |
| 2002/0062052 A1 | 5/2002 | de Rouffignac et al. |
| 2002/0062961 A1 | 5/2002 | Vinegar et al. |
| 2002/0066565 A1 | 6/2002 | de Rouffignac et al. |
| 2002/0076212 A1 | 6/2002 | Zhang et al. |
| 2002/0084074 A1 | 7/2002 | de Rouffignac et al. |
| 2002/0096320 A1 | 7/2002 | Wellington et al. |
| 2003/0040441 A1 | 2/2003 | Miller et al. |
| 2003/0062164 A1 | 4/2003 | Wellington et al. |
| 2003/0079877 A1 | 5/2003 | Wellington et al. |
| 2003/0098149 A1 | 5/2003 | Wellington et al. |
| 2003/0098605 A1 | 5/2003 | Vinegar et al. |
| 2003/0102125 A1 | 6/2003 | Wellington et al. |
| 2003/0102130 A1 | 6/2003 | Vinegar et al. |
| 2003/0116315 A1 | 6/2003 | Wellington et al. |
| 2003/0130136 A1 | 7/2003 | de Rouffignac et al. |
| 2003/0137181 A1 | 7/2003 | Wellington et al. |
| 2003/0141067 A1 | 7/2003 | de Rouffignac et al. |
| 2003/0142964 A1 | 7/2003 | Wellington et al. |
| 2003/0146002 A1 | 8/2003 | Vinegar et al. |
| 2003/0155111 A1 | 8/2003 | Vinegar et al. |
| 2003/0173072 A1 | 9/2003 | Vinegar et al. |
| 2003/0173080 A1 | 9/2003 | Berchenko et al. |
| 2003/0173081 A1 | 9/2003 | Vinegar et al. |
| 2003/0173082 A1 | 9/2003 | Vinegar et al. |
| 2003/0183390 A1 | 10/2003 | Veenstra et al. |
| 2003/0196789 A1 | 10/2003 | Wellington et al. |
| 2003/0196810 A1 | 10/2003 | Vinegar et al. |
| 2003/0201098 A1 | 10/2003 | Karanikas et al. |
| 2003/0205378 A1 | 11/2003 | Wellington et al. |
| 2003/0213594 A1 | 11/2003 | Wellington et al. |

(56) References Cited

U.S. PATENT DOCUMENTS

| | | |
|---|---|---|
| 2004/0015023 A1 | 1/2004 | Wellington et al. |
| 2004/0020642 A1 | 2/2004 | Vinegar et al. |
| 2004/0149433 A1 | 8/2004 | McQueen |
| 2005/0252656 A1 | 11/2005 | Maguire |
| 2005/0269091 A1 | 12/2005 | Pastor-Sanz et al. |
| 2007/0012598 A1 | 1/2007 | Rendall |
| 2007/0023186 A1 | 2/2007 | Kaminsky et al. |
| 2007/0193743 A1 | 8/2007 | Harris et al. |
| 2007/0209799 A1 | 9/2007 | Vinegar et al. |
| 2007/0221377 A1 | 9/2007 | Vinegar et al. |
| 2007/0284107 A1 | 12/2007 | Crichlow |
| 2008/0006410 A1 | 1/2008 | Looney et al. |
| 2008/0017549 A1 | 1/2008 | Kennel et al. |
| 2008/0023197 A1 | 1/2008 | Shurtleff |
| 2008/0059140 A1 | 3/2008 | Salmon et al. |
| 2008/0087427 A1 | 4/2008 | Kaminsky et al. |
| 2008/0087428 A1 | 4/2008 | Symington et al. |
| 2008/0116694 A1 | 5/2008 | Hendershot |
| 2008/0164030 A1 | 7/2008 | Young |
| 2008/0173450 A1 | 7/2008 | Goldberg et al. |
| 2008/0207970 A1 | 8/2008 | Meurer et al. |
| 2008/0257552 A1 | 10/2008 | Shurtleff et al. |
| 2008/0283241 A1 | 11/2008 | Kaminsky et al. |
| 2008/0290719 A1 | 11/2008 | Kaminsky et al. |
| 2008/0314593 A1 | 12/2008 | Vinegar et al. |
| 2009/0014179 A1 | 1/2009 | Mango |
| 2009/0014181 A1 | 1/2009 | Vinegar et al. |
| 2009/0050319 A1 | 2/2009 | Kaminsky et al. |
| 2009/0078415 A1 | 3/2009 | Fan et al. |
| 2009/0101346 A1 | 4/2009 | Vinegar et al. |
| 2009/0133935 A1 | 5/2009 | Kinkead |
| 2009/0200022 A1 | 8/2009 | Bravo et al. |
| 2009/0200023 A1 | 8/2009 | Costello et al. |
| 2009/0242196 A1 | 10/2009 | Pao |
| 2009/0250381 A1 | 10/2009 | Fan et al. |
| 2009/0313772 A1 | 12/2009 | Talley |
| 2010/0032171 A1 | 2/2010 | Bali et al. |
| 2010/0056404 A1 | 3/2010 | Talley |
| 2010/0126727 A1 | 5/2010 | Vinegar et al. |
| 2010/0173806 A1 | 7/2010 | Fan et al. |
| 2010/0200232 A1 | 8/2010 | Langdon et al. |
| 2010/0200234 A1 | 8/2010 | Mango |
| 2010/0218945 A1 | 9/2010 | Sadok |
| 2010/0270015 A1 | 10/2010 | Vinegar et al. |
| 2010/0270038 A1 | 10/2010 | Looney et al. |
| 2010/0282460 A1 | 11/2010 | Stone et al. |
| 2010/0319909 A1 | 12/2010 | Symington et al. |
| 2011/0000825 A1 | 1/2011 | McGrady et al. |
| 2011/0049016 A1 | 3/2011 | McGrady et al. |
| 2011/0088904 A1 | 4/2011 | de Rouffignac et al. |
| 2011/0146982 A1 | 6/2011 | Kaminsky et al. |
| 2011/0174496 A1 | 7/2011 | Burnham et al. |
| 2011/0180262 A1 | 7/2011 | O'Dowd |
| 2011/0186296 A1 | 8/2011 | Cassidy |
| 2011/0290490 A1 | 12/2011 | Kaminsky et al. |
| 2011/0303413 A1 | 12/2011 | Fairbanks et al. |

OTHER PUBLICATIONS

U.S. Appl. No. 13/335,525, filed Dec. 22, 2011, entitled "In-Situ Kerogen Conversion and Product Isolation".
U.S. Appl. No. 13/335,607, filed Dec. 22, 2011, entitled "In-Situ Kerogen Conversion and Product Upgrading".
U.S. Appl. No. 13/335,673, filed Dec. 22, 2011, entitled "In-Situ Kerogen Conversion and Recycling".
U.S. Appl. No. 13/335,195, filed Dec. 22, 2011, entitled "Preconditioning a Subsurface Shale by Removing Extractable Organics".
U.S. Appl. No. 13/335,290, filed Dec. 22, 2011, entitled "Preparation and Use of Nano-Catalyst for in Situ Reaction with Kerogen".
U.S. Appl. No. 13/335,907, filed Dec. 22, 2011, entitled "Electrokinetic Enhanced Hydrocarbon Recovery from Oil Shale".
US 6,595,286, 07/2003, Fowler et al. (withdrawn).
Vandenbrouck, M. et al., "Kerogen origin, evolution and structure", *Organic Geochemistry* 38:719-833 (2007).
Philp, R.P. et al., "Saponification of the Insoluble Organic Residues from Oil Shales, Algal Oozes, and Algae", *Energy Sources* 4(2):113-123 (1978).
Huseby, B. and Ocampo, R, "Evidence for porphyrins bound, via ester bonds, to the Messel oil shale kerogen by selective chemical degradation experiments", *Geochimica et Cosmochimica Acta* 61(18):3951-3955 (1997).
Amblès, A., et al., "Ester- and ether bond cleavage in immature kerogens", *Org. Geochem* 24(6/7):681-690 (1996).
McGowan, C.W., et al., "A Comparison of the Dissolution of Model Compounds and the Kerogen of Green River Oil Shale by Oxidation with Perchloric Acid—A Model for the Kerogen of the Green River Oil Shale", *Fuel Processing Technology* 10:195-204 (1985).
McGowan, Chris W., "The Oxidation of Green River Oil Shale with Perchloric Acid—Part I—The Reaction of Green River Oil Shale with Perchloric of Varying Concentration and Boiling Point", *Fuel Processing Technology* 10:169-179 (1985).
McGowan, Chris W., et al., "The Role of Ether Oxygen and Carbon Double Bonds as Linkages During the Dissolution of Kerogens with Perchloric Acid" *ACS Fuel* 42(1):172-175 (Spring 1997).
Boucher, Raymond J., et al., "Molecular characterization of kerogens by mild selective chemical degradation—ruthenium tetroxide oxidation", *Fuel* 70:695-708 (1991).
Robinson, W.E., et al., "Constitution of Organic Acids Prepared from Colorado Oil Shale", *Industrial and Engineering Chemistry* 48(7):1134-1128 (1956).
Philp, R.P. and Yang, E., "Alkaline Potassium Permanganate Degradation of Insoluble Organic Residues (Kerogen) Isolated from Recently-Deposited Algal Mats" *Energy Sources* 3(2):149-161 (1997).
Robinson, W.E., et al., "Alkaline Permanganate Oxidation of Oil-Shale Kerogen", *Industrial and Engineering Chemistry* 45(4):788-791 (1953).
Djuricic, M., et al., "Organic acids obtained by alkaline permanganate oxidation of kerogen from the Green River (Colorado) shale", *Geochimica et Cosmochimica Acta* 35:1201-1207 (1971).
Young, D.K. and Yen, T.F., "The nature of straight-chain aliphatic sstructures in Green River kerogen", *Geochimica et Cosmochimica Acta* 41:1411-1417 (1977).
Amblès, A., et al., "Nature of Kerogen from Green River Shale based on the Charactyer of the Products of a Forty-Step Alkaline Permanganate Oxidation", *Adv. Org. Geochem* 554-560 (1981).
Vitorovié, D., et al., "Improvement of kerogen structural interpretations based on oxidation products isolated from aqueous solutions", *Advances in Organic Geochemistry* 10:1119-1126 (1985).
Vitorovié, D., et al., "Relationship between kerogens of various structural types and the products of their multistep oxidative degradation", *Org. Geochem*. 6:333-342 (1984).
Vitorovié, D., et al., "The feasibilities of the alkaline permanganate degradation method for the characterization and classification of kerogens", *J. Serb. Chem. Soc.* 53(4):175-189 (1988).
Burlingame, A.L. and Simoneit, B.R., "High Resolution Mass Spectrometry of Green River Formation Kerogen Oxidations", *Nature* 222:741-747 (1969).
Simoneit, B.R., et al., "Sterochemical studies of acyclis isoprenoid compounds—V. Oxidation products of Green River Formation oil shale kerogen", *Geochimica et Cosmochimica Acta* 39:1143-1145 (1975).
Burlingame, A.L. and Simoneit, B.R., "Isoprenoid Fatty Acids Isolated from the Kerogen Matrix of the Green River Formation (Eocene)", *Science* 160:531-533 (1968).
Simoneit, B.R. and Burlingame, A.L., "Carboxylic acids derived from Tasmanian tasmanite by extractions and kerogen oxidations", *Geochimica et Cosmochimica Acta* 37:595-610 (1973).
Hayatsu, Ryoichi, et al., "Investigation of aqueous sodium dichromate oxidation for coal structural studies", *Fuel* 60:77-82 (1981).
Hayatsu, Ryoichi, et al., "Is kerogen-like material present in coal: 2. Chromic acid oxidation of coal and kerogen", *Fuel* 60:161-203 (1981).

(56) References Cited

OTHER PUBLICATIONS

Barakat, A.O. and Yen, T.F., "Distribution of Acyclic Isoprenoids in Fractions from Stepwise Oxidation of Greene River Kerogen", *Energy Sources* 10:253-259 ((1988).

Barakat, A.O., "Carboxylic Acids Obtained by Alkaline Hydrolysis of Monterey Kerogen", *Energy and Fuels* 7:988-993 (1993).

Barakat, Assem O., Size Distribution of the Straight-Chain Structures in Type I and II Kerogens, *Energy and Fuels* 2:181-185 (1988).

Barakat, A.O. and Yen, T.F., "Distribution of pentacyclic triterpenoids in Green River oil shale kerogen", *Org. Geochem.* 15(3):299-311 (1990).

Barakat, A.O. and Yen, T.F., "The Nature of Porphyrins in Kerogen. Evidence of Entrapped Etioporphyrin Species", *Energy & Fuels* 3:613-616 (1989).

Barakat, A.O. and Yen, T.F., "Novel Identification of 17β(H)-Hopanoids in Green River Oil Shale Kerogen", *Energy & Fuels* 2:105-108 (1988).

Barakat, Assem O. and Yen, Teh Fu, "Kerogen structure by stepwise oxidation; Use of sodium dichromate in glacial acetic acid", *Fuel* 66:587-753 (1987).

U.S. Appl. No. 13/481,303, filed May 25, 2012, entitled "Isolating Lubricating Oils from Subsurface Shale Formations".

U.S. Appl. No. 13/491,925, filed Jun. 8, 2012, entitled "Soluble Acids from Naturally Occurring Aqueous Streams".

\* cited by examiner

IN-SITU KEROGEN CONVERSION AND OXIDANT REGENERATION

RELATED APPLICATION

The subject application is related to U.S. Provisional Application Ser. No. 61/426,340, filed Dec. 22, 2010. This application is also related to U.S. application Ser. No. 13/335,409, entitled "In-Situ Kerogen Conversion and Recovery" filed Dec. 22, 2011; U.S. application Ser. No. 13/335,525, entitled "In-Situ Kerogen Conversion and Product Isolation" filed Dec. 22, 2011; U.S. application Ser. No. 13/335,607, entitled "In-Situ Kerogen Conversion and Upgrading" filed Dec. 22, 2011; U.S. application Ser. No. 13/335,673, entitled "In-Situ Kerogen Conversion and Recycling" filed Dec. 22, 2011; and U.S. application Ser. No. 13/335,195, entitled "Preconditioning a Subsurface Shale Formation by Removing Extractible Organics" filed Dec. 22, 2011. The contents of all of these related applications are incorporated herein by reference in their entirety.

BACKGROUND

If proponents of Hubbert peak theory are correct, world oil production will soon peak, if it has not done so already. Regardless, world energy consumption continues to rise at a rate that outpaces new oil discoveries. As a result, alternative sources of energy must be developed, as well as new technologies for maximizing the production and efficient consumption of oil. See T. Mast, Over a Barrel: A Simple Guide to the Oil Shortage, Greenleaf Book Group, Austin, Tex., 2005.

A particularly attractive alternative source of energy is oil shale, the attractiveness stemming primarily from the fact that oil can be "extracted" from the shale and subsequently refined in a manner much like that of crude oil. Technologies involving the extraction, however, must be further developed before oil shale becomes a commercially-viable source of energy. See J. T. Bartis et al, Oil Shale Development in the United States: Prospects and Policy Issues, RAND Corporation, Arlington, Va., 2005.

The largest known deposits of oil shale are found in the Green River Formation, which covers portions of Colorado, Utah, and Wyoming. Estimates on the amount of recoverable oil from the Green River Formation deposits are as high as 1.1 trillion barrels of oil—almost four times the proven oil reserves of Saudi Arabia. At current U.S. consumption levels (~20 million barrels per day), these shale deposits could sustain the U.S. for another 140 years (Bartis et al.) At the very least, such shale resources could moderate the price of oil and reduce U.S. dependence on foreign oil.

Oil shale typically consists of an inorganic component (primarily carbonaceous material, i.e., a carbonate), an organic component (kerogen) that can only be mobilized by breaking the chemical bonds in the kerogen, and frequently a second organic component (bitumen). Thermal treatment can be employed to break (i.e., "crack") the kerogen into hydrocarbon chains or fragments, which are gas or liquids under retort conditions, and facilitate separation from the inorganic material. This thermal treatment of the kerogen is also known as "thermal upgrading" or "retorting," and can be done at either the surface or in situ, where in the latter case, the fluids so formed are subsequently transported to the surface.

In some applications of surface retorting, the oil shale is first mined or excavated, and once at the surface, the oil shale is crushed and then heated (retorted) to complete the process of transforming the oil shale to a crude oil—sometimes referred to as "shale oil." See, e.g., Shuman et al., U.S. Pat. No. 3,489,672. The crude oil is then shipped off to a refinery where it typically requires additional processing steps (beyond that of traditional crude oil) prior to making finished products such as gasoline, lubricant, etc. Note that various chemical upgrading treatments can also be performed on the shale prior to the retorting, See, e.g., So et al., U.S. Pat. No. 5,091,076.

A method for in situ retorting of carbonaceous deposits such as oil shale has been described in Kvapil et al., U.S. Pat. No. 4,162,808. In this method, shale is retorted in a series of rubblized in situ retorts using combustion (in air) of carbonaceous material as a source of heat.

The Shell Oil Company has been developing new methods that use electrical heating for the in situ upgrading of subsurface hydrocarbons, primarily in subsurface formations located approximately 200 miles (320 km) west of Denver, Colo. See, e.g., Vinegar et al., U.S. Pat. No. 7,121,342; and Berchenko et al., U.S. Pat. No. 6,991,032. In such methods, a heating element is lowered into a well and allowed to heat the kerogen over a period of approximately four years, slowly converting (upgrading) it into oils and gases, which are then pumped to the surface. To obtain even heating, 15 to 25 heating holes could be drilled per acre. Additionally, a ground-freezing technology to establish an underground barrier around the perimeter of the extraction zone is also envisioned to prevent groundwater from entering and the retorting products from leaving. While the establishment of "freeze walls" is an accepted practice in civil engineering, its application to oil shale recovery still has unknown environmental impacts. Additionally, the Shell approach is recognized as an energy intensive process and requires a long timeframe to establish production from the oil shale.

In view of the aforementioned limitations of the above methods, simpler and more cost-effective methods of extracting the kerogen from the shale would be extremely useful.

SUMMARY OF THE INVENTION

The present invention is directed to processes for producing mobile products from the organic matter that occurs in subsurface oil shale. Among other factors, these processes are based on the discovery that kerogen in oil shale can be made to react at temperatures below pyrolysis temperatures to produce mobile reaction products that can be removed from the subsurface shale formation, recovered in surface facilities and upgraded to produce useful products, refinery feedstocks, fuel and lubricant blendstocks, reaction intermediates and the like. The presently disclosed processes are more environmentally benign, more economical, and more efficient in producing commercial products.

Disclosed herein is a process for extracting a kerogen-based product from a subsurface shale formation comprising kerogen using a chemical oxidation. The multi-step extraction process, including the oxidation step, is generally conducted at temperatures near the natural reservoir temperature. In embodiments, the oxidation step is conducted at a temperature in the range of from 0° C. to 200° C.

As disclosed herein, the process includes an oxidation step, using a chemical oxidation process, and a regeneration step, which regenerates the oxidant and restores at least a portion of its activity as an oxidizing agent. Accordingly, disclosed herein is a process for extracting a kerogen-based product from a subsurface shale formation comprising subsurface shale, including providing a first oxidant to kerogen in subsurface shale; contacting the kerogen in the subsurface shale with the first oxidant at a temperature in the range from 0° C.

and 200° C. to form organic acids; mobilizing at least a portion of the organic acids from the subsurface shale to produce a mobile kerogen-based product; and regenerating the first oxidant in the subsurface shale.

In the process, kerogen conversion reactions, the oxidant regeneration reactions and the product extraction are conducted at the same, or at different, pH ranges. In embodiments, at least one of the conversion, regeneration, and extraction steps are conducted with a formation fluid that is present in the subsurface shale formation. In embodiments, the process includes providing the first oxidant to the kerogen at a pH in the range from 7 to 9. In embodiments, a second oxidant is provided to the formation fluid, for purposes of regenerating the first oxidant, the formation fluid having a pH in the range from 6 to 8. In embodiments, organic acids are mobilized in the formation fluid as a result of the conversion process at a pH in the range from 12 to 14, to form the mobile kerogen-based product.

In one embodiment, the process for extracting a kerogen-based product from a subsurface shale formation comprising subsurface shale involves a cyclic process, including the steps of providing a first oxidant to kerogen in subsurface shale; contacting the kerogen in the subsurface shale with the first oxidant to form organic acids; and regenerating the first oxidant in the subsurface shale, in a multiplicity of processing cycles. In one such embodiments, at least a portion of the organic acids from the subsurface shale formation are recovered to provide a mobile kerogen-based product, prior to the step of regenerating the first oxidant. In another of such embodiments, at least a portion of the organic acids from the subsurface shale formation are recovered to provide a mobile kerogen-based product, subsequent to the multiplicity of regeneration cycles.

In a further embodiment, the process includes the steps of: providing a first oxidant to kerogen in subsurface shale; contacting the kerogen in the subsurface shale with the first oxidant at a temperature in the range from 0° C. and 200° C. to form organic acids; mobilizing at least a portion of the organic acids from the subsurface shale to produce a mobile kerogen-based product; recovering the mobile kerogen-based product comprising the organic acids; and regenerating the first oxidant in the subsurface shale.

In a further embodiment, the process includes the steps of: providing a first oxidant to kerogen in subsurface shale; contacting the kerogen in the subsurface shale with the first oxidant at a temperature in the range from 0° C. and 200° C. to form organic acids; mobilizing at least a portion of the organic acids from the subsurface shale to produce a mobile kerogen-based product; regenerating the first oxidant in the subsurface shale; and recovering the mobile kerogen-based product comprising the organic acids.

In a further embodiment, the process includes the steps of: providing a first oxidant to kerogen in subsurface shale; contacting the kerogen in the subsurface shale with the first oxidant at a temperature in the range from 0° C. and 200° C. to form organic acids; providing a second oxidant to the kerogen in the subsurface shale to regenerate the first oxidant in a regeneration step; contacting the kerogen in the subsurface shale with the regenerated first oxidant for a period of at least 4 hours to form organic acids; repeating the regeneration step of providing the second oxidant to the kerogen in the subsurface shale to regenerate the first oxidant; and recovering a mobile kerogen-based product comprising the organic acids.

DETAILED DESCRIPTION OF THE INVENTION

Introduction

Figure 1:
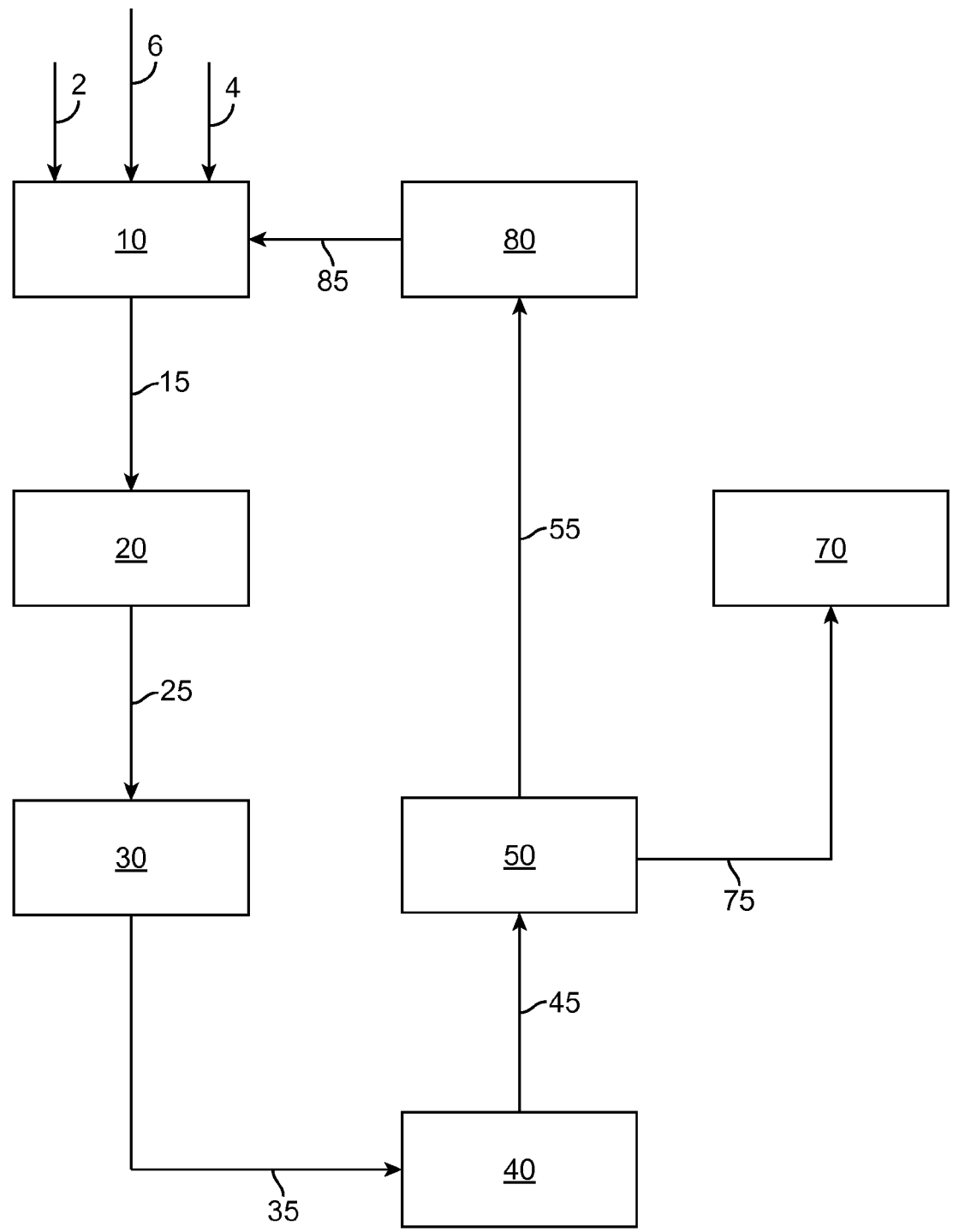
FIG. 1 is a block diagram illustrating an exemplary sequence of steps involving providing a reactive fluid comprising an oxidant to a subsurface shale formation that contains kerogen, regenerating the oxidant, recovering a mobile kerogen-based product from the formation and isolating organic acid products from the mobile kerogen-based product.

The present invention is directed to methods of extracting a kerogen-based product from subsurface shale formation comprising kerogen in an inorganic matrix. The methods rely on chemically modifying the shale-bound kerogen to render it mobile using an oxidant that is provided to the kerogen in the subsurface shale in a liquid medium. The oxidant converts the kerogen to a mobile kerogen-based product at temperatures below that at which the kerogen thermally decomposes by pyrolysis or thermal cracking. The oxidant (i.e. first oxidant) is maintained in the subsurface shale formation for sufficient time to significantly reduce the oxidation activity of the oxidant. A second oxidant is then provided to the subsurface shale to regenerate the first oxidant and to restore at least some of the oxidation activity of the first oxidant. The present invention is also directed to systems for implementing such methods.

The process is for the conversion of carbonaceous deposits into mobile products, which may be recovered for use in the generation of energy and/or in the production of fuels, lubricants, solvents and/or petrochemicals that are generally formed during petroleum processing and refining. Any carbonaceous deposit may be beneficially treated by the process. Exemplary deposits include oil shale, coal, tar sands, heavy oil and the like. In the following description of the process, specific attention is paid to converting the hydrocarbonaceous material that occurs in what is commonly termed "oil shale", with the understanding that application of the process in its general form is not so limited.

Definitions

In accordance with this detailed description, the following abbreviations and definitions apply. It must be noted that as used herein, the singular forms "a", "an", and "the" include plural referents unless the context clearly dictates otherwise. Thus, for example, reference to an "oxidant" includes a plurality of such.

As used herein, a range encompasses all values within the limits of the stated range, including the end members of the range. In an illustrative example, "having a pH in a range from 8 to 12" includes all integer and fractional values from 8 and 12, including a pH of 8 or a pH of 12.

As used herein, the terms "hydrocarbon" or "hydrocarbonaceous" or "petroleum" are used interchangeably to refer to material originating from oil shale, coal, tar sands, crude oil, natural gas or biological processes. Carbon and hydrogen are major components of hydrocarbons; minor components, such as oxygen, sulfur and nitrogen may also occur in some hydrocarbons. The hydrocarbon fraction includes both aliphatic and aromatic components. The aliphatic component can further be divided into acyclic alkanes, referred to as paraffins, and cycloalkanes, referred to as naphthenes. A paraffin refers to a non-cyclic, linear (normal paraffin) or branched (isoparaffin) saturated hydrocarbon. For example, a $C_8$ paraffin is a non-cyclic, linear or branched hydrocarbon having 8 carbon atoms per molecule. Normal octane, methylheptane, dimethylhexane, and trimethylpentane are examples of $C_8$ paraffins. A paraffin-rich feed comprises at least 10 wt %, at least 20 wt % or even at least 30 wt % paraffins. For example, a $C_8$ rich paraffinic feedstock contains at least 10 wt. % $C_8$ hydrocarbons.

As disclosed herein, boiling point temperatures are based on the ASTM D-2887 standard test method for boiling range distribution of petroleum fractions by gas chromatography, unless otherwise indicated. The mid-boiling point is defined as the 50% by volume boiling temperature, based on an ASTM D-2887 simulated distillation.

As disclosed herein, carbon number values (i.e., $C_5$, $C_6$, $C_8$, $C_9$ and the like) generally refers to a number of carbon atoms within a molecule. Carbon number ranges as disclosed herein (e.g., $C_8$ to $C_{12}$) refer to molecules having a carbon number within the indicated range (e.g., between 8 carbon and 12 carbon atoms), including the end members of the range. Likewise, an open ended carbon number range (e.g., $C_{35}+$) refers to molecules having a carbon number within the indicated range (e.g., 35 or more carbon atoms), including the end member of the range. As described herein, carbon number distributions are determined by true boiling point distribution and gas liquid chromatography.

Unless otherwise specified, feed rate to a catalytic reaction zone is reported as the volume of feed per volume of catalyst per hour. In effect, the feed rate as disclosed herein, referred to as liquid hourly space velocity (LHSV), is reported in reciprocal hours (i.e., $hr^{-1}$).

As used herein, the value for octane refers to the research octane number (RON), as determined by ASTM D2699.

The term "surface facility" as used herein is any structure, device, means, service, resource or feature that occurs, exists, takes place or is supported on the surface of the earth. The kerogen products that are generated in the process disclosed herein are recovered in surface facilities and upgraded or transported for upgrading.

"Shale," as defined herein, generally refers to "oil shale" and is a general term applied to a group of rocks rich enough in organic material (called kerogen) to yield petroleum upon pyrolysis and distillation. Such shale is generally subsurface and comprises an inorganic (usually carbonate) component or matrix in addition to the kerogen component.

A "subsurface shale formation," as defined herein, is an underground geological formation comprising (oil) shale. The subsurface shale formation comprises kerogen in an inorganic matrix.

A "low-permeability hydrocarbon-bearing formation," as defined herein, refers to formations having a permeability of less than about 10 millidarcies, wherein the formations comprise hydrocarbonaceous material. Examples of such formations include, but are not limited to, diatomite, coal, tight shales, tight sandstones, tight carbonates, and the like.

"Kerogen," as defined herein and as mentioned above, is an organic component of shale. On a molecular level, kerogen comprises very high molecular weight molecules that are generally insoluble by virtue of their high molecular weight and likely bonding to the inorganic component or matrix of the shale. In a geologic sense, kerogen is a precursor to crude oil. Kerogen is typically identified as being one of five types: Type I, Type II, Type II-sulfur, Type III, or Type IV, based on its C:H:O ratio and sulfur content, the various types generally being derived from different sources of ancient biological matter.

"Kerogen-based," and "kerogen-derived are terms used herein to denote a molecular product or intermediate derived from kerogen, such derivation requiring a chemical modification of the kerogen, and the term being exclusive of derivations carried out over geologic timescales.

"Extractible organics" are organic components of the subsurface shale formation that are at least partially soluble in an organic solvent. In contrast, the kerogen is not soluble in organic solvent. This organic component that is at least partially soluble is referred to herein as "extractible organics". This extractible organic component includes what is commonly referred to as "bitumen". The extractable organic component is a solid or semi-solid material that is soluble or at least partially soluble in an organic solvent. As such, the extractable organic component can be removed by extraction using an organic solvent. Extraction of the extractable organic component makes the kerogen more accessible. In the present methods, extraction of the extractable organic component makes the kerogen more accessible to oxidants for reaction to create mobile kerogen-based product. Extraction of the extractable organic component is disclosed in U.S. application Ser. No. 13/335,195, "Preconditioning a Subsurface Shale Formation by Removing Extractable Organics", filed Dec. 22, 2011, the contents of which are incorporated herein by reference in their entirety.

"Organic acid" is a term used herein to denote a molecular entity containing at least one carboxylic acid functional group, either in the non-ionized form (e.g., —COOH), in the ionized form (e.g., —COO—), or salts thereof. The term "organic acid" is meant to encompass a high molecular weight kerogen fragment (e.g., a molecular mass of up to 12,000 to 15,000 daltons and higher) comprising at least one carboxylic acid functional group. The term "organic acid" is further meant to encompass a low molecular weight acid, including a monoacid such as acetic acid and a diacid such as oxalic acid. As used herein, the term "monoacid" is used to denote having one carboxylic acid functional group per molecule. Likewise, the term "diacid" denotes two, and "triacid" denotes three carboxylic acid functional groups per molecule.

The term "reactive fluid," as used herein, refers to fluid comprising an oxidant that is passed to the kerogen in the subsurface shale formation.

The term "extractive fluid," as used herein, refers to a fluid that is prepared with additives for mobilizing the organic acid reaction products in the subsurface shale.

The term "aqueous fluid" as used herein refers to any water containing fluid, including pure water, such as, municipal water; surface water, including from a lake, sea, ocean, river, and/or stream; formation water; water associated with industrial activity; or mixtures thereof.

The term "formation water" as used herein refers to the water or aqueous fluid that is naturally occurring in a geological formation, such as the subsurface shale formation, or in a subsurface aquifer. The amount (or presence) of formation water in the formation, and the amount (or presence) of formation water in contact with the kerogen in the formation, depends on a number of factors, including the depth of the subsurface shale formation or the kerogen deposit located therein. In some cases, formation water is present in the formation prior to the start of the process for extracting a kerogen-based product from a subsurface shale formation. The naturally occurring formation water may contain dissolved alkali materials from naturally occurring deposits in the environment of the subsurface shale.

The term "formation fluid" as used herein, is the fluid in contact with the kerogen in the subsurface shale formation. Formation fluid may include the formation water that occurs naturally at, or in the environment of, the subsurface shale. Formation fluid may also include, for example, a fluid (or fluids) that is supplied to the kerogen from the surface. Formation fluid may also include, for example, oxidants, or surfactants, or alkali materials, or mixtures thereof that are supplied from the surface. Formation fluid may also include reaction products from chemical reactions and/or physical absorption processes of the kerogen (and/or bitumen) in the subsurface shale formation.

The term "spent formation fluid," as used herein, refers to the oxidation activity of the formation fluid, and by extension the concentration of oxidant in the formation fluid. A spent formation fluid has a reduced amount of oxidant, and therefore a reduced oxidation activity toward the conversion of kerogen or products from kerogen conversion. Unless otherwise indicated, a spent formation fluid is one which produces an insignificant amount of reaction products at the temperature of the fluid over the time in which the fluid is withdrawn as a mobile kerogen-based product from the formation.

The terms "natural" or "naturally occurring" refer to conditions existing before, or without, human intervention. Thus, a "natural formation temperature," as used herein, refers to the temperature of the subsurface shale formation, prior to or in the absence of human intervention with or in the formation. In a specific example, a naturally occurring aqueous fluid may originate from a subterranean aquifer or from a surface body of water such as a river or stream or from a pond or lake that has not been modified by man. In another specific example, a "naturally occurring" aqueous basic solution refers to a solution present in the formation prior to, or in the absence of, human intervention in the formation.

A "surfactant" as used herein refers to any substance that reduces surface tension of a liquid, or reduces interfacial tension between two liquids, or between a liquid and a solid, or facilitates the dispersion of an organic material into an aqueous solution.

The term "basic solution," as used herein, refers to an aqueous solution having a pH of greater than 7.

The term "acidic solution," as used herein, refers to an aqueous solution having a pH of less than 7.

A "dense phase fluid," as defined herein, is a non-gaseous fluid. Such dense phase fluids include liquids, supercritical fluids (SCFs), and fluids at supercritical conditions. The dense phase fluid can be any such fluid that suitably provides for increased accessibility of the kerogen to a fluid—typically due to fracturing and/or rubblizing of the shale in which the kerogen resides.

A "supercritical fluid," as used herein, is any substance at a temperature and pressure above its thermodynamic critical point. Supercritical fluids can be regarded as "hybrid solvents" with properties between those of gases and liquids, i.e., a solvent with a low viscosity, high diffusion rates and no surface tension. Common supercritical fluids include supercritical carbon dioxide ($CO_2$) and supercritical water. For example, the critical temperature of $CO_2$ is 31.1° C., and the critical pressure of $CO_2$ is 72.9 atm (7.39 MPa).

The term "mechanical stress," as used herein, refers to structural stresses within the shale formation that result from pressure variations within the formation. Such stress can lead to fracturing and/or rubblization of the shale formation.

The term "thermal stress," as used herein, refers to structural stresses within the shale formation that result from thermal variations. Such thermal stresses can induce internal mechanical stresses as a result of differences in thermal coefficients of expansion among the various components of the shale formation. Like mechanical stress mentioned above, thermal stress can also lead to fracturing and/or rubblization of the shale formation.

The term "fracturing," as used herein, refers to the structural degradation of a subsurface shale formation as a result of applied thermal and/or mechanical stress. Such structural degradation generally enhances the permeability of the shale to fluids and increases the accessibility of the kerogen component to such fluids. The term "rubblization," as used herein, is a more extensive fracturing process yielding fracture planes in multiple directions that generate shale derived "rubble."

The term "cracking," as mentioned in the background section and as used herein, refers to the breaking of carbon-carbon bonds in the kerogen so as to yield species of lower molecular weight. "Retorting," provides thermal cracking of the kerogen. "Upgrading," provides cracking of the kerogen, but can involve a thermal or chemical upgrading agent. Accordingly, the term "thermal upgrading" is synonymous with the term "retorting."

Hydrocracking is a chemical reaction of liquid feed materials, including hydrocarbons, petroleum and other biologically derived material, in the presence of hydrogen and one or more catalysts, resulting in product molecules having reduced molecular weight relative to that of the liquid feed materials. Additional reactions, including olefin and aromatic saturation and heteroatom (including oxygen, nitrogen, sulfur and halogen) removal may also occur during hydrocracking.

Pyrolysis temperature, as used herein, is the temperature at which the kerogen thermally decomposes without the intervention of a catalytic or chemical agent.

The term "in situ," as used herein refers to the environment of the subsurface shale formation.

The term "commercial petroleum-based products," as used herein, refers to commercial products that include, but are not limited to, gasoline, aviation fuel, diesel, lubricants, petrochemicals, and the like. Such products can also include common chemical intermediates and/or blending feedstocks.

"Optional" or "optionally" means that the subsequently described event or circumstance may, but need not, occur, and that the description includes instances where the event or circumstance occurs and instances in which it does not.

Method Overview

The present invention is generally directed to methods for extracting a kerogen-based product from a subsurface shale formation comprising subsurface shale. The methods include the steps of: providing a first oxidant to kerogen in subsurface shale; contacting the kerogen in the subsurface shale with the first oxidant at a temperature in the range from 0° C. and 200° C. to form organic acids; mobilizing at least a portion of the organic acids from the subsurface shale to produce a mobile kerogen-based product; and regenerating the first oxidant in the subsurface shale.

The step of contacting the kerogen with an oxidant generally involves an in situ chemical modification of the kerogen (e.g., cracking) and/or surrounding shale so as to render the modified kerogen component mobile. Such chemical modification generally involves the making and/or breaking of chemical bonds. In one embodiment, the chemical modification involves the formation of reaction products that contain organic acid and/or organic acid functional groups. At least a portion of these reaction products may be mobilized using an alkaline aqueous solution. The step of transporting the mobile kerogen-based product out of the subsurface shale formation can generally be described as a means of flowing the mobile kerogen-based product out of the subsurface formation, where such a means can be active (e.g., pumping) and/or passive.

In an embodiment, the step of isolating the organic acids from the mobile kerogen-based product involves reducing the relative solubility of the organic acids in the mobile kerogen-based product. One exemplary method involves converting an ionized form of the acid, e.g., a salt of the acid such as a sodium salt, to the corresponding protonated (e.g., non-ionized) form of the acid. In another embodiment, reducing the relative solubility involves contacting the mobile kerogen-based product with a hydrocarbonaceous extractant for extracting at least some of the organic acids from the mobile kerogen-based product to the hydrocarbonaceous extractant. In another embodiment, reducing the relative solubility involves converting the acid to a corresponding ester. In an embodiments, the step of isolating the soluble organic acids involves separating the acids from a carrier fluid by physical means, such as, for example, liquid-liquid separation, distillation, membrane separation, froth flotation, phase separation, electrostatic separation, coalescence, biological processes, thermal separation processes, and steam distillation.

In one embodiment, the above-described method may involve one or more additional steps which serve to sample and subsequently analyze the shale prior to, or in the alternative during, or in the alternative after, performing the step of increasing the accessibility of the kerogen. Such sampling and analysis can have a direct bearing on the techniques employed in the subsequent steps.

In one embodiment, the extracted kerogen-based product is upgraded (thermally and/or chemically) in a surface facility. Such surface upgrading can be intermediate to subsequent refining.

In an illustrative embodiment, a reactive fluid containing at least one reactive component and having a pH of at least 7 is provided to the kerogen in the subsurface shale. The reactive component facilitates cracking reactions in the kerogen, producing mobile organic acid reaction products. The mobile reaction products are absorbed into an aqueous fluid to form a mobile kerogen-based product; the reaction product enriched aqueous fluid is then removed to surface facilities for processing. A reactive fluid may further be provided to the subsurface shale for dissolving or otherwise absorbing mobile reaction products for removal to surface facilities for processing. In another illustrative embodiment, the reactive fluid containing at least one reactive component, and having a pH of less than or equal to 7 is provided to the kerogen in the subsurface shale.

The subsurface shale formation comprises an organic component, at least a portion of which is the kerogen as defined herein. The subsurface shale formation further comprises an inorganic component in addition to the kerogen.

The subsurface shale formation is accessed from the surface through at least one well. In general, the well will be cased, at least for a portion of its distance. Specifications for drilling access wells into a subsurface shale formation are known. In most applications of the invention, multiple wells will be provided into the subsurface shale formation, the well pattern based on recognized principles for this application. In one embodiment, a portion of the wells are employed as injection wells for passing fluids from the surface to the formation, and a portion of the wells are employed as production wells for withdrawing fluids from the formation to the surface. Each of the multiple wells may be used successively as an injection well and a production well, depending on the needs of the process. In an alternative, each well may be prepared and managed optimally as either an injection well or a production well. Specifications of each well for preparing and using the well as an injection well and/or a production well can readily be developed by one of skill in the art.

Conversion Process

The conversion process is a chemical conversion process, with reagents being provided to the kerogen to facilitate the fracture of chemical bonds in the kerogen and between the kerogen and the inorganic matrix in which the kerogen naturally occurs. While the reagents that are provided to convert the shale may be provided as solids, liquids or gases, it has been found that the conversion reactions are facilitated by the introduction of liquid phase materials, or alternatively by using liquid phase materials that are naturally present in the shale formation, for converting the kerogen. Use of liquid phase oxidants during kerogen cracking conversion may advantageously be conducted at liquid phase temperatures, including temperatures in the range from 0° C. to 200° C. The kerogen cracking conversion may advantageously be conducted at formation pressure, or at a pressure sufficiently above formation pressure to permit provision of liquid phase reactants to the kerogen in the oil shale formation.

Oxidant

In one embodiment, the process includes providing an oxidant to kerogen in subsurface shale. Depending on the oxidant, it may be provided in solid, liquid or gaseous form. In liquid form, the oxidant may be provided in acidic, neutral, or alkaline conditions; the choice of pH depends at least in part on the type of oxidant used. Some oxidants are better suited for acidic conditions. For oxidants of this type, the oxidant is provided to the kerogen at a pH in a range from 1.5 to 6.5. Maintaining the pH in this range will generally require the addition of an acidic material to the kerogen. Examples include mineral acids such as hydrochloric acid, sulfuric acid, nitric acid, phosphoric acid and combinations thereof, or organic acids such as one or more of the carboxylic acids having from 2 to 15 carbon atoms, or mixture thereof may be used. With the carboxylic acids, monoacids, diacids, or triacids may be used. In one embodiment, the pH is maintained in a range from 1.5 to 6.5 by provision of $CO_2$ to the kerogen, alone or in combination with other acids.

Some oxidants are better suited for conditions at neutral pH. Supplying oxidants of this type generally involves supplying the oxidants in combination with a buffered solution, to maintain the pH in the neutral range while contacting the mineral matter within the subsurface shale.

In one embodiment, the oxidant is provided to the kerogen at a pH in a range from 7 to 14, with an embodiment in the range from 7 to 9. Maintaining the pH in the desired alkaline range will be facilitated in some situations by the carbonate and bicarbonate materials that are natural to the subsurface shale formation. Otherwise, the pH in the range from 7 to 14, or in the range from 7 to 9, may be maintained by supply of an alkaline material, such as a carbonate, a bicarbonate, an oxide, a hydroxide, or combinations thereof. In one embodiment, the pH is maintained in a range from 7 to 9 by provision of $CO_2$ to the kerogen.

Carrier Fluid

In one embodiment, the oxidant is provided to the kerogen in combination with a carrier fluid, the combination being prepared in surface facilities and passed to the subsurface shale through an injection well. Exemplary carrier fluids include an aqueous fluid, an ethanol fluid or combinations thereof. An ethanol fluid contains ethanol, and typically at least 30 wt. % ethanol, such as from 30 wt. % to 100 wt. % ethanol. The ethanol fluid may also contain water. Likewise, the aqueous fluid may contain ethanol. In one embodiment, the carrier fluid encompasses a concentration range from 100 wt. % water to 100 wt. % ethanol, or any combination between.

The carrier fluid generally contains sufficient oxidant to facilitate the production of organic acids from the kerogen in a desired time frame. Higher concentrations of the oxidant generally results in faster reaction rates. In one embodiment, the carrier fluid contains from 0.1 wt. % to 40 wt. % of the oxidant; in another embodiments from 0.1 wt. % to 25 wt. %; in another embodiment from 1 wt. % to 15 wt. %.

The carrier fluid is prepared at a pH that is suited for the particular oxidant used. In one embodiment, the carrier fluid has a pH in the range from 7 to 14; in another embodiment in the range from 7 to 9; in another embodiment in the range from 1.5 to 6.5. Alkaline materials, inorganic acids, organic acids and $CO_2$ are suitable reagents for the preparation of the carrier fluid at different pH levels.

In one embodiment, the carrier fluid comprises an organic solvent. Illustrative organic solvents that are suitable include refinery streams boiling in the range from 100° C. to 500° C.; $C_4$ to $C_{21}$ hydrocarbons, including naphtha, diesel fuel, and gas oils; alcohols, including methanol, ethanol, propanol, butanol; aromatics, including benzene, toluene, the xylenes and alkyl substituted variations thereof; ethers; ketones; esters; tetralin; n-methyl-2-pyrrolidone; tetrahydrofuran; and 2-methyl-tetrahydrofuran. In one embodiment, the formation fluid includes a mixture of an aqueous solvent and an organic solvent, in any proportion.

Permanganate Oxidant

In one embodiment, the process includes contacting the kerogen in the subsurface shale with a permanganate oxidant to form organic acids. The permanganate may be supplied to the kerogen from surface facilities, either in solid form or as a solution. When supplied in aqueous or ethanol solution, sufficient permanganate is provided to react with kerogen at a temperature in the range of 0° C. to 200° C. to form organic acids. The permanganate solution may contain up to the solubility limit of the permanganate at formation temperatures. In one embodiment, the permanganate solution contains in the range from 0.1 wt. % to 40 wt. % permanganate, or in the range from 0.1 wt. % to 25 wt. % permanganate, or in the range from 1.0 wt. % to 15 wt. % permanganate, expressed in terms of the weight of anhydrous permanganate salt dissolved in a given weight of solution. With ethanol solutions, the ethanol may be the only solvent, or it may be used as a co-solvent in the solution. The permanganate may be any soluble permanganate-containing material. Ammonium permanganate, $NH_4MnO_4$; calcium permanganate, $Ca(MnO_4)_2$; potassium permanganate, $KMnO_4$; and sodium permanganate, $NaMnO_4$ are suitable permanganates for the process.

A permanganate solution supplied to the kerogen may be tailored to complement chemical features of the oil shale formation, or the chemical features of a formation fluid, if present in the formation. In one embodiment, the permanganate solution has a pH of at least 7, or in the pH range of from 7 to 9. In some such embodiments, the desired permanganate solution pH is achieved with the addition of an alkaline material. Exemplary alkaline materials which are useful include, for example at least one of carbonates, bicarbonates, oxides, and hydroxides of, for example, sodium, potassium, calcium, and magnesium. An illustrative extractive fluid contains a molar ratio of carbonate to bicarbonate in the range from 5:95 to 95:5; or in the range from 10:90 to 90:10; or in the range from 25:75 to 75:25.

In the process, the permanganate oxidant in contact with the kerogen forms organic acids and manganese oxides as reduced forms of the manganese oxidant, including reduced forms such as $MnO_2$, $Mn^{2+}$ and $MnO_4^-$.

In one embodiment, a surfactant or mixture of surfactants are provided to the kerogen in the subsurface shale. The surfactant can be any substance that reduces surface tension of the fluid, or reduces interfacial tension between two liquids, or one liquid and the surrounding formation. The surfactant can also be chosen, for example, to increase the accessibility of the fluid to the kerogen, and/or to increase the mobility of the reaction products from the kerogen, and/or to increase the effectiveness of the fluid for absorbing the reaction products. Suitable surfactants for use in the present fluids may be selected from nonionic, anionic or amphoteric surfactants.

Reactive Fluid

In one embodiment, the permanganate oxidant is combined with a solvent or carrier fluid to form a reactive fluid for passing to the kerogen in the subsurface shale formation. The reactive fluid is designed and formulated to provide oxidant to the formation fluid, and to maintain the integrity of the oxidant until it is in contact with the kerogen. In one embodiment, the reactive fluid is further formulated to mobilize organic acids, which are formed during kerogen conversion, either as a suspension of colloidal kerogen fragments or as a solution of dissolved organic acids.

The reactive fluid includes a carrier fluid that may be either an aqueous solvent, or an organic solvent, or combinations thereof. The carrier fluid may be provided from any suitable source, such as, for example, one or more of municipal water; surface water or water from a subsurface aquifer; bitter water sources with high pH levels, and containing quantities of one or more of carbonates, bicarbonates, oxides, and hydroxides, which are recovered from subsurface aquifers; reactive water; and recycle aqueous fluids from the kerogen conversion and extraction process. In one embodiment, the recycle aqueous fluid contains organic acids which remain in solution following the step of isolating at least a portion of the organic acids from the mobile kerogen-based product. In one embodiment, the recycle aqueous fluid contains organic acids from the isolating step that are added back to the recycle aqueous fluid as surfactants. In one such embodiment, the recycle aqueous fluid contains at least 0.1 wt. % organic acids, including, for example, at least 0.5 wt. % organic acids; or at least 1.0 wt. % organic acids.

At least a portion of the reactive fluid may be prepared in surface facilities. It may be desirable to locate the preparation of the aqueous reactive fluid such that the prepared fluid is conducted by pipeline transport from the preparation location to the injection well for providing the fluid to the subsurface shale.

The permanganate oxidant concentration in the reactive fluid is determined by a number of factors, including the stability and reactivity of the oxidant at the conditions of the subsurface formation, the nature of the inorganic component of the subsurface shale, and the desired products from the kerogen conversion reactions. In one embodiment, the oxidant concentration in the reactive fluid is kept at a low level to reduce the secondary oxidation reactions of the organic acids which have been liberated from the kerogen. In one embodiment, the reactive fluid as provided to the subsurface shale formation contains in the range from 0.1 wt. % to 100 wt. % oxidant; or in the range from 0.1 wt. % to 40 wt. % oxidant; or in the range of 0.1 wt. % to 25 wt. % oxidant, or in the range from 1 wt. % to 15 wt. %. In one embodiment, the reactive fluid contains from 0.1 wt. % to 40 wt. % of the oxidant in a carrier fluid selected from the group consisting of an aqueous fluid, an ethanol fluid or combinations thereof.

The pH of the reactive fluid containing the permanganate oxidant has a pH in a range from 7 to 14; in one embodiment, from 7 to 9. Achieving the desired pH may include the addition of an alkaline material to the reactive solution. Exemplary alkaline materials which are useful include, for example at least one alkaline material selected from carbonates, bicarbonates, oxides, and hydroxides of, for example, sodium, potassium, calcium, and magnesium. An illustrative reactive fluid contains a molar ratio of carbonate to bicarbonate in the range from 5:95 to 95:5; or in the range from 10:90 to 90:10; or in the range from 25:75 to 75:25.

In one embodiment, the reactive fluid comprises a surfactant or mixture of surfactants for provision to the kerogen in the subsurface shale. The surfactant can be any substance that reduces surface tension of the fluid, or reduces interfacial tension between two liquids, or one liquid and the surrounding formation. The surfactant can also be chosen, for example, to increase the accessibility of the fluid to the kerogen, and/or to increase the mobility of the reaction products from the kerogen, and/or to increase the effectiveness of the fluid for absorbing the reaction products. Suitable surfactants for use in the present fluids may be selected from nonionic, anionic or amphoteric surfactants.

In one embodiment, the reactive fluid further comprises at least one phase transfer catalyst to enhance the chemical interaction between kerogen and oxidant, for increasing the reaction rate of the oxidant. In one such embodiment, the phase transfer catalyst is selected from the group consisting of tetraethyl ammonium chloride and the crown ether 1,4,7,10,13,16-hexaoxacyclooctadecane (18-crown-6 crown ether).

Formation Fluid

In the process, kerogen in subsurface shale is contacted with the permanganate oxidant. In one embodiment, the oxidant contacts the kerogen in the subsurface shale in liquid medium, otherwise termed a "formation fluid". In this case, at least a portion of the liquid medium may be the reactive fluid that is prepared in surface facilities and passed to the subsurface shale through an injection well. Likewise, at least a portion of the liquid medium may be formation water that is naturally occurring in the subsurface shale.

Reaction conditions and the composition of the formation fluid for converting kerogen into the mobile kerogen-based product are selected to minimize the environmental effects of the process for extracting the kerogen-based product; and/or to maximize the conversion of kerogen into the mobile kerogen-based product; and/or to maximize the selectivity of the reaction to $C_{10}$+ organic acids; and/or to minimize the conversion of the kerogen to $CO_2$.

The step of contacting the kerogen with the formation fluid in the subsurface shale is generally conducted at or near a natural formation temperature. In one embodiment, the contacting occurs at a temperature in the range of between 0° C. and 200° C. In one embodiment, the contacting occurs at a temperature of less than 200° C. above the natural formation temperature. In one embodiment, the contacting occurs at a temperature below a pyrolysis temperature of the kerogen. In one such embodiment, the contacting occurs at a temperature in one the following ranges: between 10° C. and 150° C.; between 20° C. and 100° C.; or between 25° C. and 75° C. In one such embodiment, the formation fluid contacts the kerogen at a temperature of less than 150° C.; or less than 100° C.; or even less than 75° C. above the natural formation temperature. In a non-limiting specific example, the contacting is conducted at a temperature of less than 50° C. above the natural formation temperature. In one embodiment, the contacting is conducted under conditions in which no added heat is supplied to the formation fluid and/or to the subsurface shale in contact with the formation fluid. In one embodiment, if heat is supplied during the kerogen conversion to meet the above-mention target temperature, it is supplied solely from exothermic chemical processes within the kerogen and/or within the subsurface shale in contact with the kerogen. As such, no external heating is provided. The contacting occurs at temperature below pyrolysis temperature of the kerogen.

Generally, the kerogen in the subsurface shale is contacted with the formation fluid at or above natural formation pressure (i.e., the pressure of the subsurface shale formation in the region that includes the kerogen), so as to maintain or increase the accessibility of the fluids to kerogen in the subsurface shale formation. In one such embodiment, the formation fluid is provided to the formation at a pressure above fracture pressure, so as to increase the accessibility of the formation fluid to the kerogen in the formation. Methods for determining the formation pressure and the formation fracture pressure are known. In one such embodiment, the formation fluid is provided to the formation at a pressure of up to 1000 psig; or up to 750 psig; or up to 500 psig; or even up to 250 psig above the natural formation pressure. The natural formation pressure, as used herein, is the pressure of the subsurface shale formation, in the region of the kerogen, prior to human intervention with or in the formation. Methods for determining an natural formation pressure are known.

In one embodiment, the process includes contacting the kerogen in the subsurface shale with an oxidant. The mobile kerogen-based product comprises reaction products from the reaction of the oxidant with the kerogen. The step of creating a mobile kerogen-based product involves a chemical modification of the kerogen. The chemical modification involves at least some cracking of the kerogen, generating smaller kerogen-derived molecules that are correspondingly more mobile.

In one embodiment, a fluid, such as a formation fluid in contact with the kerogen, facilitates the kerogen reactions. The formation fluid may be caused to flow through the subsurface shale formation for an amount of time needed to reach a certain objective, e.g., a reduced oxidant concentration target in the formation fluid, or a target amount of mobile reaction products produced, or a target extent of conversion of the kerogen. The formation fluid may then be caused to flow through the subsurface shale formation for an amount of time need to reach a certain objective, e.g., a target removal of mobile reaction products, or a target concentration of mobile reaction products in the formation fluid. In another embodiment, the process of providing reactive fluid to the kerogen may be a cyclic process, repeated until a target level of kerogen conversion is achieved. In another embodiment, a formation fluid is suitable for both converting kerogen in the subsurface shale and absorbing the reaction products to form the mobile kerogen-based product, which is recovered for isolating the organic acids contained therein.

In one embodiment, pumping is used to transport the mobile kerogen-based product out of the subsurface shale formation, wherein such pumping can be performed using techniques known to those of skill in the art. Conventional oil field practices (both flowing gas and pumping fluids, e.g., rod pumps, electrical submersible pumps, progressive cavity pumps, etc.) can be modified to provide reliability in a given producing environment. For example, modifications may require changes in metallurgy, pressure limitations, elastomeric compositions, temperature rating, and the like.

Production could use any standard producing process such as, but not limited to, at least one well penetrating into the subsurface shale formation as an injection well for providing fluids to the subsurface shale formation and at least one well penetrating into the subsurface shale formation as a production well for producing fluids from the formation, Huff-n-Puff (i.e., a single well is used as both the producer and injector), water flooding, steam flooding, polymer flooding, solvent extraction flooding, thermal processes, diluent addition, steam assisted gravity drainage (SAGD), and the like.

The formation fluid is a fluid, such as an aqueous fluid, which is in contact with the kerogen in the subsurface shale formation. In one embodiment, at least a portion of the formation fluid is supplied as a reactive fluid from surface facilities. In one embodiment, the reactive solution provided to the kerogen establishes a formation fluid in contact with the kerogen, or it supplements a formation fluid which is already established, or which is naturally occurring in the subsurface shale formation in contact with the kerogen. In one embodiment, the formation fluid is derived from, or results from, formation water that naturally occurs within the formation. The formation fluid may be present and in contact with the kerogen in the formation, in small quantities which merely wet the solid surfaces in the formation. Alternatively, the formation fluid may be present in sufficient quantities to flood the formation; or in any quantity between the wetted or flooded states.

The formation fluid is any fluid (including mixtures) that can, either by itself, with an agent combined with the fluid, or in combination with a solvent, chemically modify the kerogen so as to render it mobile and therefore extractable. In one embodiment, the formation fluid comprises an oxidant having a chemical property of oxidation. In one aspect, the oxidant is active for breaking chemical bonds in kerogen. In one aspect, the oxidant is active for breaking carbon-oxygen bonds in kerogen. In one aspect, the oxidant is active for breaking carbon-carbon double bonds in kerogen. In one aspect, the oxidant has a low activity for breaking carbon-carbon single bonds in kerogen. In one aspect, the oxidant is active for producing mobile reaction products from kerogen. In one aspect, the oxidant is active for facilitating the mobilization of hydrocarbons from kerogen in subsurface shale.

In one embodiment, at least a portion of the aqueous formation fluid is recovered as a naturally occurring aqueous basic solution from one or more subsurface aquifers; at least a portion of the naturally occurring aqueous basic solution may occur with the subsurface shale. Suitable naturally occurring aqueous basic solutions have a pH of at least 7; or at least 8; or at least 8.5; or in the range of between 7 and 14. In one such embodiment, the naturally occurring aqueous basic solution floods the subsurface shale and is available for absorbing the converted products, or is caused to flow from its source to the subsurface shale that contains the converted products. In another such embodiment, the naturally occurring aqueous basic solution is recovered from the aquifer through a well drilled into the aquifer. The recovered solution, optionally with added components, such as added carbonates, bicarbonates, oxides and/or hydroxides and/or added surfactants, is passed through an injection well into the subsurface shale resource for extracting the hydrocarbon products present therein.

In one embodiment, at least a portion of the alkaline materials, including one or more of carbonates and bicarbonates and oxides and hydroxides, that are present in the formation fluid are derived from naturally occurring deposits. Naturally occurring sources of the alkaline materials are known. The following carbonate and bicarbonate minerals are non-limiting examples.

Sodium sesquicarbonate ($Na_3H(CO_3)_2$) is either a double salt of sodium bicarbonate and sodium carbonate, or an equimolar mixture of those two salts, with varying quantities of water of hydration.

The dihydrate, $Na_3H(CO_3)_2.2H_2O$, occurs in nature as mineral trona.

Thermonatrite is a naturally occurring mineral form of sodium carbonate $Na_2CO_3.(H_2O)$.

Natron is a naturally occurring mixture of sodium carbonate decahydrate ($Na_2CO_3.10H_2O$) and sodium bicarbonate ($NaHCO_3$), often with relatively minor quantities of sodium chloride and sodium sulfate.

Nahcolite is a naturally occurring form of sodium bicarbonate ($NaHCO_3$).

Shortite is a naturally occurring form of a sodium-calcium carbonate mineral ($Na_2Ca_2(CO_3)_3$).

As a non-limiting illustrative example, a reactive fluid is passed, via an injection well, to a source of the alkaline materials within or near the subsurface shale resource to dissolve the alkaline materials into the formation fluid before being passed to the formation fluid in the subsurface shale formation. In some cases, liquid water is injected under sufficient pressure into the carbonate and/or bicarbonate source to cause the water to wet at least a portion of the source and to dissolve at least some of the carbonate and/or bicarbonate into the water.

In one such embodiment, the water that contains the dissolved alkaline materials is caused to flow from the deposit in which it occurs to the subsurface shale resource that contains the converted hydrocarbon products. In another such embodiment, the solution of the dissolved alkaline materials is recovered from the aquifer through a well drilled into the aquifer. The recovered solution, optionally with added components, such as added carbonates, bicarbonates, oxides and/or hydroxides, or added surfactants, is passed through an injection well into the subsurface shale resource for extracting the hydrocarbon products present therein.

In another such embodiment, at least a portion of the water is introduced to the deposit of alkaline materials as steam, and in some cases as superheated steam, to facilitate the dissolution of the alkaline materials into the water. At least some of the steam condenses, dissolves the alkaline materials, and is passed to the subsurface shale formation.

In one such embodiment, the process includes contacting the kerogen with the fresh formation fluid, and producing a spent formation fluid which contains less than 20 wt. %, or less than 10 wt. %, or less than 5 wt. % of the oxidant, or less than 1 wt. % of the oxidant, or less than 0.5 wt. % of the oxidant, or less than 0.1 wt. % of the oxidant. In one embodiment, the reactivity of the formation fluid is enhanced by addition of a combination of oxidants.

The formation fluid has a pH that is generally selected to balance the stability, reactivity and solubility of the oxidant in the formation fluid with the solubility and stability of the kerogen reaction products in the formation fluid. Oxidants that exhibit high kerogen conversion activity in aqueous fluid at pH values of at least 7 are generally supplied to the subsurface shale formation in a basic solution (i.e., basic formation fluid). In one such embodiment, the desired reactive solution pH is achieved with the addition of an alkaline material to the reactive solution. Exemplary alkaline materials which are useful include, for example at least one alkaline material selected from carbonates, bicarbonates, oxides, and hydroxides of, for example, sodium, potassium, calcium, and magnesium. An illustrative formation fluid contains a molar ratio of carbonate to bicarbonate in the range from 5:95 to 95:5; or in the range from 10:90 to 90:10; or in the range from 25:75 to 75:25.

The formation fluid may be further treated with acids or bases to tailor the pH of the formation fluid, to, for example, account for the solubility and/or stability of the oxidant or to increase the solubility of the mobile organic acids produced during the kerogen conversion process. In one embodiment, the formation fluid that is supplied to the subsurface shale has a pH of less than or equal to 7, or in the range from 1.5 to 6.5. In another embodiment, the formation fluid that is supplied to the subsurface shale has a pH of at least 7. In this case, the pH of the formation fluid is selected both to facilitate the solubility of organic acids in the formation fluid and to facilitate the chemical stability and reactivity of the oxidant at subsurface shale formation conditions. In one embodiment, the formation fluid is supplied to the subsurface shale formation at a pH in the range of 7 to 14; or in the range of 7 to 9.

The formation fluid may further contain other components for, e.g., enhancing the reactivity of the reactive components, for enhancing the accessibility of the formation fluid to the kerogen, or for enhancing the dissolution, absorption, or dispersion of mobile reaction products into the formation fluid.

Formation Water

Formation water, a naturally occurring liquid source within at least some kerogen deposits in subsurface shale, is a suitable source for at least a portion of the formation fluid used for converting kerogen and recovering useful products. Some kerogen deposits are directly in contact with formation water. Other kerogen deposits are wetted by residual formation water. In other deposits, the formation water aquifer is remote from the kerogen deposit which is being exploited for recovering useful products. When sufficient formation water is present, either in contact with the kerogen or sufficiently near the kerogen deposit to be passed to the kerogen deposit, the formation water may be useful as a source of at least some of the components of the formation fluid.

Certain subsurface shale formations, such as the Green River Shale, are characterized by limestone deposits that produce formation water aquifers having a basic pH (i.e., pH greater than 7). In one embodiment, formation waters are useful as a source or a component of the formation fluid. In an exemplary process, oxidant is provided to formation water to form the formation fluid, which facilitates the conversion of kerogen at a temperature in the range of between 0° C. and 200° C. to form organic acids.

In the case in which the kerogen is naturally in contact with formation water that is suitable for the process, the process includes providing an oxidant to the formation water to produce the formation fluid. For formations in which the formation water having the desired properties is in an aquifer separate from (or remote to) the kerogen, the formation water may be caused to pass from the remote aquifer to the kerogen. This may be achieved, for example, by causing the formation water to pass from the remote aquifer through a borehole which is drilled into the formation water aquifer. In one embodiment, the formation water is passed through the borehole to surface facilities, and processed by addition of oxidant and then provided to the kerogen. In another embodiment, the formation water is passed through the borehole directly to the kerogen in the subsurface shale formation.

When at least a portion of the mobile kerogen-based product is withdrawn from the formation, additional formation fluid in the region of the kerogen is produced by flowing additional formation water to, and contacting, the kerogen in the subsurface shale formation to replace the fluid that was withdrawn. In one embodiment, one or more oxidants are provided to the additional formation water that flows into contact with the kerogen.

As stated, a suitable formation water desirably has a pH of at least 7, or in the range from 7 to 14, or in the range from 12 to 14. In one embodiment, the formation water comprises an alkaline material selected from the group consisting of a carbonate, a bicarbonate, an oxide, and a hydroxide. An exemplary alkaline material is selected from the group consisting of sodium carbonate, sodium bicarbonate, and sodium hydroxide, or mixtures thereof.

In the process, a formation fluid which comprises formation water and an oxidant contacts the kerogen for a time sufficient to reduce the oxidant concentration to a target low level. In one embodiment, the formation fluid is caused to contact with kerogen for a time sufficient to reduce the oxidant concentration in the formation fluid to less than 0.5 wt. %, or for a time sufficient to reduce the oxidant concentration in the formation fluid to less than 0.1 wt. %, or to reduce the oxidant concentration in the formation fluid to less than 0.05 wt. %.

Use of formation water as a component of the formation fluid permits the use of a cyclic process to convert kerogen and recover useful products. An exemplary cyclic process comprises the steps of: (a) providing an oxidant to formation water that is in contact with kerogen in subsurface shale to form a formation fluid; (b) contacting the kerogen in the subsurface shale with the formation fluid at a temperature in the range of between 0° C. and 200° C. to form organic acids; (c) recovering at least a portion of the organic acids from the subsurface shale formation to form a mobile kerogen-based product; (d) withdrawing at least a portion of the mobile kerogen-based product from the formation; (e) providing additional oxidant to the formation water in contact with the kerogen; and (f) repeating steps (b), (c), (d), and (e) a multiplicity of cycles, and converting at least 50 wt. % of the kerogen to organic acids. In one embodiment, the cyclic process also includes recycle steps, including: isolating at least a portion of the organic acids from the mobile kerogen-based product; recovering an organic acid lean aqueous fluid; and providing at least a portion of the organic acid lean aqueous fluid, in combination with added oxidant, to the formation fluid in contact with the kerogen.

During the oxidation process, as the oxidant chemically oxidizes the kerogen to form reaction products, the concentration of the active oxidant is itself reduced to a less active (in an oxidation sense) form. For example, within broad ranges it is known that permanganate is converted as follows during redox reactions in model systems:

(a) In an acidic solution, permanganate(VII) is reduced to the colorless +2 oxidation state of the manganese(II) (Mn2+) ion: $8H^+ + MnO_4^- + 5e^- \rightarrow Mn_2^+ + 4H_2O$;

(b) In a strongly basic solution, permanganate(VII) is reduced to the green +6 oxidation state of the manganate, $MnO_4^{2-}$: $MnO_4^- + e^- \rightarrow MnO_4^{2-}$; and (c) In a neutral medium, permanganate (VII) is reduced to the brown +4 oxidation state of manganese dioxide: $MnO_2$: $2H_2O + MnO_4^- + 3e^- \rightarrow MnO_2 + 4OH^-$.

In the process, a formation fluid which comprises formation water and an oxidant contacts the kerogen for a time sufficient to reduce the permanganate oxidant concentration to a target low level. In one embodiment, the formation fluid is caused to contact with kerogen for a time sufficient to reduce the permanganate oxidant concentration in the formation fluid to less than 50 wt. %, or for a time sufficient to reduce the oxidant concentration in the formation fluid to less than 25 wt. %, or for a time sufficient to reduce the oxidant concentration in the formation fluid to less than 10 wt. % of the original concentration.

Organic Acids

In the process, the oxidant contacts the kerogen to form organic acids. The organic acids may be saturated, unsaturated, or polyunsaturated. In one embodiment, at least a portion of the organic acids are branched; the branching functional groups may be paraffinic, olefinic or cyclic. Cyclic branching functional groups may be saturated, unsaturated or aromatic. The organic acids may also contain nitrogen and/or sulfur atoms. In one embodiment, the organic acids are monoacids (a single carboxyl functional group in non-ionized or ionized form per molecular unit), or diacids (two carboxyl functional groups per molecular unit), or triacids (three carboxyl functional groups per molecular unit), or higher. Mobile kerogen fragments, including kerogen fragments having a molecular mass of up to 12,000 to 15,000 Daltons or higher, may have multiple carboxyl functional groups that serve to render these fragments mobile in an aqueous medium. These high molecular weight fragments are generally mobilized in the fluid as a slurry, rather than as a pure solution. Under some conditions, the organic acids are present as salts. An exemplary sodium salt of an organic acid contains the carboxyl function group represented by —COO—Na+.

The molecular weight of the organic acids covers a very wide range, including from low molecular weight acids, such as the monoacid, acetic acid, and the diacid, oxalic acid, to high molecular weight kerogen fragments, having a molecular mass of up to 15,000 daltons or higher, and comprising at least one carboxylic acid functional group. In one embodiment, these kerogen fragments have a lower molecular mass than the naturally occurring kerogen itself, but with the general characteristic chemical and conformational complexity of the kerogen structures from which they are derived. Such high molecular weight acids are soluble in, or otherwise mobile in, high pH solutions, such as solutions having a pH of at least 7.5; or at least 8.0; or at least 8.5; or in the range of between 8.5 and 14. Accordingly, in one embodiment, at least 10 wt. %, or at least 30 wt. %, or at least 50 wt. % of the organic acids in the mobile kerogen-based product is in the $C_{35}+$ range. In one embodiment, at least 20 wt. % of the $C_{35}+$ organic acids has a molecular mass number of greater than 1000 daltons.

In one embodiment, a significant fraction of the organic acids are also in the $C_6$ to $C_{20}$ carbon number range. In one such embodiment, at least 10 wt. % of the organic acids in the mobile kerogen-based product are in the $C_6$ to $C_{20}$ range, or in the $C_6$ to $C_{16}$ range, or in the $C_8$ to $C_{14}$ range or in the $C_8$ to $C_{12}$ range. In one such embodiment, at least 20 wt. % of the $C_{35}-$ organic acids is in the $C_8$ to $C_{12}$ range. Maintaining reaction conditions to minimize the amount of oxidation of the kerogen while ensuring that the reaction products are mobile has the benefit of decreased oxidant consumption, minimum formation of carbon dioxide product, and reduced hydrogen consumption during the hydrogenation of the acid products during an upgrading step.

In general, the mobile kerogen-based product contains at least one of the following organic acids and hydrocarbons: monoacids, diacids, branched monoacids, branched diacids, isoprenoid acids, iopanoic acids, gamma keto acids, keto monoacids, keto diacids, and n-alkanes. In the range from 10 wt. % to 90 wt. % of the $C_{35}-$ organic acids in the mobile kerogen-based product are monoacids. In one such embodiment, in the range from 10 wt. % to 50 wt. % of the $C_{35}-$ organic acids are monoacids. Likewise, in the range from 10 wt. % to 90 wt. % of the $C_{35}-$ organic acids in the mobile kerogen-based product are diacids. In one embodiment, at least 30 wt. % of the $C_{35}-$ organic acids are diacids. In one such embodiment, in the range from 30 wt. to 90 wt. % of the $C_{35}-$ organic acids are diacids. In one embodiment, in the range from 1 wt. % to 30 wt. %, or in the range from 1 wt. % to 20 wt. %, or in the range from 1 wt. % to 10 wt. % of the $C_{35}-$ organic acids in the mobile kerogen-based product are gamma keto acids.

Mobile Kerogen-based Product

In one embodiment, the organic acids are mobilized to produce a mobile kerogen-based product. The mobile kerogen-based product generally contains at least 1 wt. % organic acid derived products; or at least 2 wt. % organic acid derived products; or at least 5 wt. % organic acid derived products. In some situations, the organic acid derived products are present in the product at a concentration in the range from 5 wt. % to 50 wt. %; or at a concentration in the range from 10 wt. % to 40 wt. %. The ratio of organic acid derived products to other hydrocarbons in the mobile kerogen-based product will depend on the source of the hydrocarbons, but is expected to range from 10% organic acid derived products to 100 wt. % organic acid derived products.

It is believed that organic acids comprise a significant portion of the kerogen based product formed from reaction of oxidants on the kerogen. However, when the organic acids are mobilized, organic acid reaction products may be involved. As such, mobilization of the organic acids may involve, for example, neutralization, dimerization and esterification of the organic acids.

Thus, in one embodiment, the mobile kerogen-based product may comprise organic acid as organic acids. In one embodiment, the mobile kerogen based product may comprise organic acids as organic acid anionic moieties (RCOO—) or organic acid salts (RCOO-M+). The cation (M+) of the organic acid salts can be cations that are naturally present in the formation, for example, sodium, potassium, calcium and magnesium. In one embodiment, the mobile kerogen based product may comprise organic acids as esters. Exemplary esters include methyl and ethyl esters. In one embodiment, the mobile kerogen-based product may comprise organic acids in a form selected from the group consisting of organic acids, organic acid salts, anionic organic acid moieties, organic acid esters, and mixtures thereof.

The mobile kerogen-based product may further include components to facilitate extraction of reaction products from the kerogen. These components may include, for example, one or more of a solvent or solvent mixture; alkaline materials; surfactants; organic and/or inorganic acids; organic and/or inorganic bases; soluble organic compounds such as alcohols, ethers, esters, ketones, aldehydes, and the like. In one embodiment, the mobile kerogen-based product is an aqueous phase fluid containing the organic acid derived products, which are dissolved, dispersed, or suspended in the aqueous phase fluid.

In one embodiment, the organic acid reaction products are mobilized at a pH of at least 7, or at a pH in a range from 7 to 14. The pH of the mobile kerogen-based product into which organic acids are extracted, following conversion of the kerogen, may, under some conditions, have a pH in a range from 7 to 14 by reason of contact with alkaline materials in the subsurface shale. Alternatively, at least a portion of the alkaline materials present in mobile product may be provided from surface facilities. Exemplary alkaline materials which are useful include, for example at least one alkaline material selected from carbonates, bicarbonates, oxides and hydroxides of, for example, sodium, potassium, calcium, and magnesium. In an illustrative process, organic acids are extracted from kerogen in contact with alkaline materials, such that a molar ratio of carbonate to bicarbonate in the range from 5:95 to 95:5; or in the range from 10:90 to 90:10; or in the range from 25:75 to 75:25.

The pH of the mobile fluid in contact with the kerogen, for extracting organic acid reaction products, is tailored for the particular organic acids to be extracted into and absorbed by the mobile product. Low molecular weight acids are soluble in fluids having a pH at or near the neutral range (i.e. a pH in a range from 6 to 8). High molecular weight kerogen fragments may be mobilized as a colloid or slurry in the mobile product at a pH in a range from 12 to 14.

Formation of the mobile kerogen-based product may be facilitated by the presence of one or more organic solvents. Suitable organic solvents are selected to remain in a liquid phase, and to maintain the reaction products in solution, at temperature and pressure conditions within the subsurface shale. In one embodiment, a suitable organic extractant is one in which at least a portion of the organic acids are soluble. Exemplary organic extractants contain aromatic compounds such as benzene, toluene and xylene; nitrogen containing solvents such as NMP, amines, and amides; oxygenates containing compounds such as acids, ketones, esters and aldehydes; paraffins and naphthenes; olefins and the like. Illustrative organic solvents include refinery streams boiling in the range from 100° C. to 500° C., such as diesel fuel or naphtha.

In one embodiment, the mobile kerogen-based product may include carbon disulfide. Hydrogen sulfide, in addition to other sulfur compounds produced from the formation, may be converted to carbon disulfide using known methods. Suitable methods may include oxidation reaction of the sulfur compound to sulfur and/or sulfur dioxides, and by reaction of sulfur and/or sulfur dioxides with carbon and/or a carbon containing compound to form the carbon disulfide formulation.

Extraction

The step of extracting and absorbing the organic acid reaction products into the mobile kerogen-based product fluid is generally conducted at or near the natural formation temperature. In one such embodiment, the absorbing is conducted at a temperature of less than 200° C.; or less then 150° C.; or less than 100° C.; or even less than 75° C. above the natural formation temperature. In one such embodiment, the absorbing is conducted at a temperature in the range of between 0° C. and 200° C.; or in the range of between 10° C. and 150° C.; or in the range of between 20° C. and 100° C.; or even in the range of between 25° C. and 75° C. In a non-limiting specific example, the absorbing is conducted at a temperature of no greater than 50° C. above the natural formation temperature.

In one embodiment, the absorbing is conducted under conditions in which no added heat is supplied to the formation fluid and/or to the subsurface shale in contact with the formation fluid. In one embodiment, if heat is supplied during the kerogen conversion to meet the above-mention target temperature, it is supplied solely from exothermic chemical processes within the kerogen and/or within the subsurface shale in contact with the kerogen. In one embodiment, the absorbing is conducted at a temperature below pyrolysis temperature.

Generally, the organic acids in the subsurface shale are absorbed into the mobile kerogen-based product at or above formation pressure (i.e., the pressure of the subsurface shale formation in the region that includes the kerogen), so as to maintain or increase the accessibility of the fluids to kerogen in the subsurface shale formation. In one embodiment, the organic acid reaction products are extracted from the kerogen and into the mobile kerogen-based product at a pressure of up to 1000 psig above the formation pressure; or up to 750 psig above the formation pressure; or up to 500 psig above the formation pressure; or even up to 250 psig above the formation pressure. Injection of a gas into the formation may result in a viscosity reduction of some of the hydrocarbon products in the formation.

In one embodiment, a formation fluid is maintained in contact with the kerogen until a target amount of mobile reaction products have been absorbed by the formation fluid, i.e., for a time sufficient to produce a mobile kerogen-based product which contains at least 1 wt. % organic acids; or at least 2 wt. % organic acids; or at least 5 wt. % organic acids. Progress toward reaching the target amount may be monitored, for example, by withdrawing the fluids to the surface for analysis, by analyzing the fluids in the subsurface shale formation, or by analyzing the fluids in a well extending into the formation.

In one embodiment, a formation fluid that is suitable for mobilizing the reaction products has a pH of greater than a target value, e.g., greater than 7, and the formation fluid is maintained in contact with the kerogen for a time during which the pH of the formation fluid remains higher than the target minimum pH value. When the pH approaches or drops below the target minimum, the formation fluid may be removed from the subsurface shale, its alkaline content may be supplemented with alkaline additives, or it may be supplemented with added reactive fluid.

Regeneration

In the process, a second oxidant is supplied to the formation fluid for regenerating the oxidation activity of the first oxidant. In embodiments that include using a permanganate as the first oxidant, kerogen conversion resulting from contacting the kerogen in the subsurface shale with a permanganate oxidant, $MnO_4^-$, forms organic acids and manganese oxides, including manganese dioxide, $MnO_2$, manganese ion ($Mn^{2+}$), manganate $MnO_4^{2-}$, or combinations thereof. In one embodiment, a second oxidant is supplied to regenerate the reduced forms of permanganate to more oxidatively active forms. When permanganate oxidant is employed, any second oxidant, other than permanganate, that converts at least one reduced manganese form, such as manganese dioxide ($MnO_2$); or manganate ($MnO_4^{2-}$); or $Mn^{2+}$ to permanganate ($MnO_4^-$) at a temperature in the range of 0° C. to 200° C. is suitable for the process. In one embodiment, a second oxidant other than permanganate is supplied to the manganese oxides in the subsurface shale, such that at least a portion of manganese oxides are regenerated to at least one of $MnO_4^{2-}$ or $MnO_4^-$.

Suitable oxidants that are at least partially soluble in water may be supplied to the kerogen and/or the formation fluid in an aqueous solution or slurry, or in a solution containing ethanol. In one embodiment, solutions of the second oxidant contain at least 0.1 wt. % of the second oxidant. While the solution that provides the second oxidant to the formation fluid may contain traces, or more, of permanganate, the second oxidant that is provided to the formation water is an oxidant other than permanganate. In one embodiment, the second oxidant is selected for its activity with respect to manganese oxidation, its minimal environmental impact, and its relative stability during transport to the formation fluid, and it's relatively low cost. Exemplary oxidants that meet at least one of these criteria include peroxides, ozone and oxygen. Suitable peroxides include hydrogen peroxide, organic peroxides, including peroxy acids and hydroperoxides, and inorganic peroxides. The peroxides may be supplied to the kerogen from surface facilities, or generated in-situ by reaction of suitable reagents. Ozone, as well, may be supplied from surface facilities or generated in-situ, either by chemical reaction of suitable reagents or by equipment designed to generate ozone from gaseous oxygen. Oxygen, including an oxygen-containing gas, may also be used as the second oxidant.

In one embodiment, regeneration of the oxidative activity of the formation fluid is conducted at a pH of at least 6, or in the range from 6 to 8. In one embodiment, regeneration is conducted at a temperature in the range from 0° C. to 200° C., or in the range from 20° C. to 150° C. In some such embodiments, the regeneration step includes flowing oxygen or an oxygen-containing gaseous mixture through the subsurface shale at a flow rate and at a partial pressure of oxygen such that a temperature of the subsurface shale in the presence of the oxygen is no higher than 100° C. above a natural reservoir temperature.

Second oxidants that are normally gaseous at a formation pressure and a formation pressure may be provided to the subsurface shale as a gaseous oxidant, such as, for example oxygen or an oxygen-containing gas. In one embodiment, the oxygen is supplied as air to the formation fluid. Some compression might be necessary to cause the air to flow through or into the formation. In one embodiment, the air supplied to the formation as a second oxidant contains added oxygen. In one embodiment, the air supplied to the formation is slightly depleted in oxygen by, for example, addition of extra nitrogen, helium, argon and the like to air.

In one embodiment, a secondary oxidant such as an oxygen-containing gaseous stream may be caused to flow through the subsurface shale to enhance and/or to maintain the oxidation activity of the formation fluid and of the first oxidant contained therein.

In an embodiment, a liquid solution having a pH of at least 7 and containing at least 0.02 wt. % to 25 wt. % is provided to kerogen in subsurface shale, or to a formation fluid in contact with the kerogen, for converting at least a portion of the kerogen to organic acids. The conversion reactions are conducted in alkaline conditions, with the pH of the formation fluid in the range of at least 7, or in the range from 7 to 9. Additional alkaline materials may be provided to the formation fluid during reaction to maintain the target pH. Suitable alkaline materials include, for example at least one of carbonates, bicarbonates, oxides, and hydroxides of, for example, sodium, potassium, calcium, and magnesium.

The first oxidant is maintained in contact with the kerogen for a time sufficient to cause conversion reactions to occur at a reaction temperature in the range from 0° C. to 200° C. and at formation pressure. In one embodiment, the oxidant is maintained in contact with kerogen for at least 4 hours, or for at least 12 hours. In another embodiment, the formation fluid is maintained in contact with the kerogen for a period in the range from 1 hour to 45 days; in another embodiment from 12 hours to 20 days; in another embodiment from 1 day to 7 days, In one embodiment, the organic acids generated during kerogen conversion are mobilized in the formation fluid having a pH of at least 7, or having a pH of at least 12, or having a pH in the range from 12 to 14. Reaching the desired formation fluid pH may require supplying additional alkaline materials. The mobile kerogen-based product comprising the mobilized organic acids in the formation fluid is recovered for recovery of organic acids and further processing.

In one embodiment, a liquid solution having a pH of at least 7 and containing in the range from 0.1 wt. % to 40 wt. % of a first oxidant is caused to flow through subsurface shale which contains kerogen. The flowing liquid solution causes the formation of organic acids through conversion reactions of the kerogen. Organic acid products are mobilized by the flowing liquid solution. The mobile kerogen-based product comprising the mobilized organic acids in the formation fluid is recovered for recovery of organic acids and further processing.

In one embodiment, a liquid solution having a pH of at least 7 and containing at least 0.1 wt. % to 40 wt. % of a first oxidant is provided to kerogen, or to a formation fluid in contact with the kerogen, for a period of at least 4 hours at a temperature in the range from 0° C. to 200° C. for conversion of at least a portion of the kerogen to organic acids. A second oxidant is then provided to the formation fluid in the shale formation for regenerating the first oxidant. In one embodiment, the second oxidant is provided to the formation fluid at a pH in the range from 6 to 8. In one embodiment, the second oxidant is provided for a period of at least 4 hours. In one embodiment, the first oxidant is regenerated at a temperature in the range from 0° C. to 200° C. Before the second oxidant is provided to the formation fluid, it may be desirable to reduce the pH of the formation fluid. Exemplary fluids for reducing the pH of the formation fluid include supplying $CO_2$ to the formation fluid.

Regenerating the oxidation activity of the formation fluid and of the first oxidant contained therein provides a formation fluid having activity for continuing conversion of the kerogen and formation of organic acids. A cyclic process involving oxidation with a first oxidant, and regeneration with a second oxidant may be conducted a number of times. Recovery of organic acid products to produce a mobile kerogen-based product may be performed after each oxidation step, or intermittent throughout the cyclic process, or following a final oxidation step at the conclusion of the cyclic process. The cyclic process may be conducted until a target amount of kerogen has been converted to mobilized products, i.e. until at least 50 wt. %, or at least 60 wt. %, or at least 70 wt. %, or at least 80 wt. %, or at least 90 wt. % of the kerogen in a region of the subsurface shale is converted to mobilized products at the conclusion of the cyclic process.

Generally, multiple oxidation and product recovery cycles will be necessary to convert much of the kerogen to useful products. The following embodiments illustrate approaches to the cycle process. In one embodiment, the process for extracting a kerogen-based product includes providing a first oxidant to kerogen in subsurface shale, contacting the kerogen in the subsurface shale with the first oxidant to form organic acids, regenerating the first oxidant in the subsurface shale and repeating the extraction, contacting and regenerating steps Use of formation water as a component of the formation fluid permits the use of a cyclic process to convert kerogen and recover useful products. An exemplary cyclic process comprises the steps of: (a) providing an oxidant to formation water that is in contact with kerogen in subsurface shale to form a formation fluid; (b) contacting the kerogen in the subsurface shale with the formation fluid at a temperature in the range of between 0° C. and 200° C. to form organic acids; (c) recovering at least a portion of the organic acids from the subsurface shale formation to form a mobile kerogen-based product; (d) withdrawing at least a portion of the mobile kerogen-based product from the formation; (e) providing additional oxidant to the formation water in contact with the kerogen; and (f) repeating steps (b), (c), (d), and (e) a multiplicity of cycles, and converting at least 50 wt. % of the kerogen to organic acids. In one embodiment, the cyclic process also includes recycle steps, including: isolating at least a portion of the organic acids from the mobile kerogen-based product; recovering an organic acid lean aqueous fluid; and providing at least a portion of the organic acid lean aqueous fluid, in combination with added oxidant, to the formation fluid in contact with the kerogen.

In an exemplary process illustrated in FIG. 1, a reactive fluid is prepared in a preparation step 10 by mixing a first oxidant 2 with a carrier fluid 4, which may be aqueous or organic. Mixing devices for mixing the first oxidant with the carrier fluid to make the reactive fluid are well known. In one embodiment, the first oxidant that is used is effective for reacting with kerogen in an alkaline medium; under these conditions the fluid may optionally be mixed with an alkaline material 6 to result in a fluid having a pH of at least 7.

The reactive fluid mixture 15 is passed to the kerogen in the subsurface shale formation in step 20 via a first (e.g., injection) well that has been drilled to penetrate the subsurface formation to provide access to the kerogen within the formation. The reactive fluid combines with a fluid already present to form a formation fluid 25, in contact with the kerogen. In one embodiment, the subsurface shale formation has been fractured to enhance the permeability of the shale to the first oxidant and to increase the accessibility of the kerogen component to this fluid. In step 30 the first oxidant reacts with the kerogen to produce a mobile kerogen-based product 35, which is produced to the surface in step 40. In one embodiment, multiple reactive fluid batches are provided to the formation fluid, prior to recovery of the mobile kerogen-based product. The timing of each reactive fluid addition depends, at least in part, on the progress of the kerogen conversion, and on the relative reactivity of the formation fluid in contact with the kerogen. For example, another reactive fluid batch may be provided to the formation fluid when the first oxidant concentration in the formation fluid falls below 30 wt. %, or below 20 wt., or below 10 wt. % of the initial first oxidant concentration in the fluid.

In the process, a second oxidant is prepared in step 60, and provided to the kerogen through stream 65 for regenerating the first oxidant that is in contact with the kerogen in step 30. In one embodiment, the first oxidant in contact with the kerogen is regenerated multiple times before another batch of reactive fluid is provided to the formation fluid, or prior to recovery of the mobile kerogen-based product.

The mobile kerogen-based product 45 produced at the surface is treated in step 50 for isolation and recovery of the organic acids and other mobile hydrocarbons 65. In one embodiment, at least a portion of the reaction products recovered from the kerogen conversion is absorbed by naturally occurring alkaline enriched water that is present in the subsurface shale. In the illustrative process shown in FIG. 1, the organic acids 65 isolated in step 50 are subjected to further processing in step 70. In an embodiment of the illustrative process, an organic acid lean fluid 55 that is produced from the isolation step 50 is further treated in step 80 for recycle 85 to the subsurface shale formation.

Figure 2:
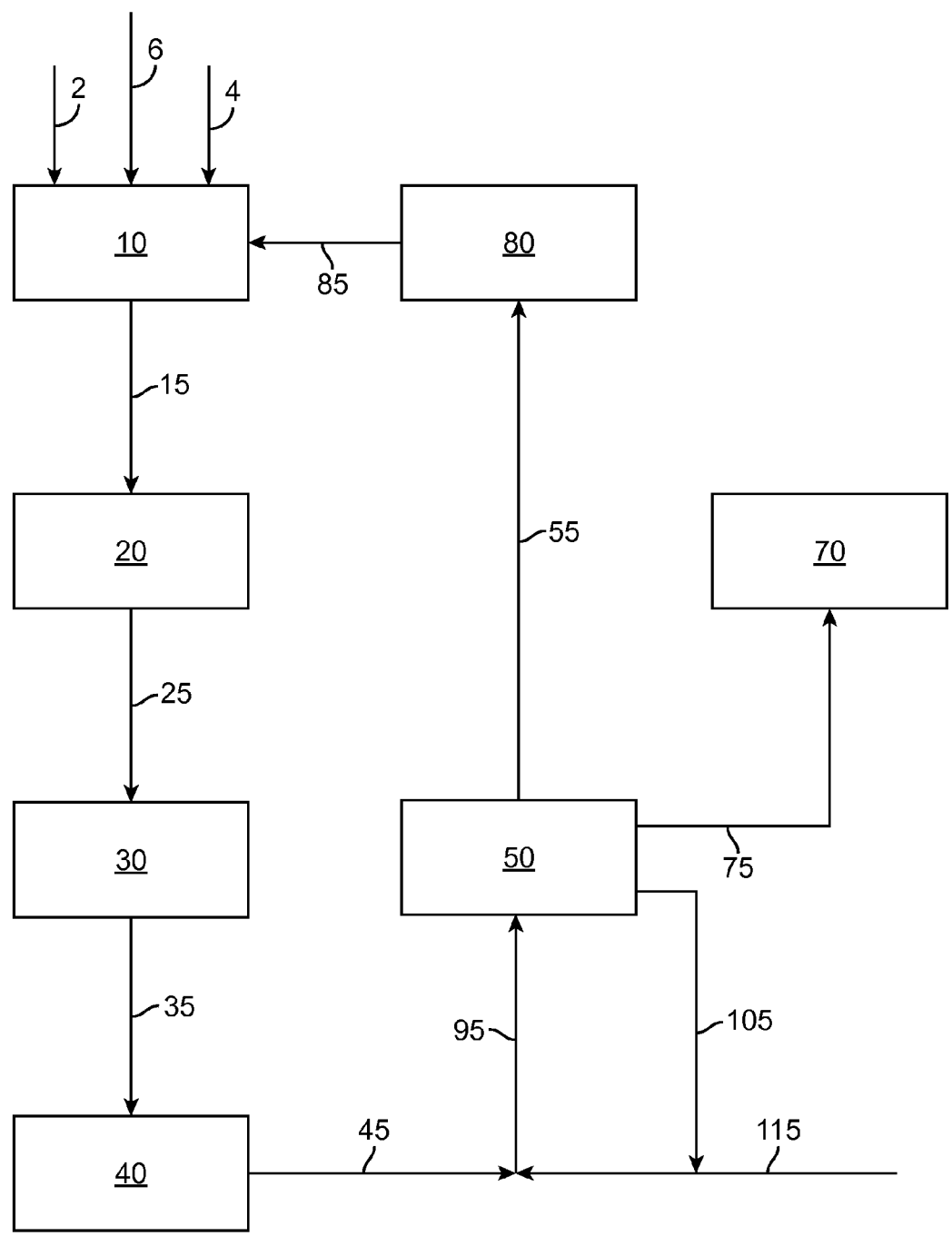
FIG. 2 is a block diagram illustrating the added step of passing an organic extractant to the mobile kerogen-based product for extracting at least a portion of the organic acids contained in the mobile kerogen-based product.

In an exemplary process illustrated in FIG. 2, and with further reference to the descriptions above relating to FIG. 1, in step 30 the first oxidant reacts with the kerogen to produce a mobile kerogen-based product 35, which is produced to the surface in step 40. In the process, a second oxidant is prepared in step 60, and provided to the kerogen through stream 65 for regenerating the first oxidant that is in contact with the kerogen in step 30. In one embodiment, the first oxidant in contact with the kerogen is regenerated multiple times before another batch of reactive fluid is provided to the formation fluid, or prior to recovery of the mobile kerogen-based product.

Further in FIG. 2, a mobile kerogen-based product 35 is produced to the surface in step 40. The mobile kerogen-based product 45 produced at the surface is combined with an organic extractant 75 and the combination treated in step 50 for isolation and recovery of the organic acids and other mobile hydrocarbons 65. The organic acids 65 isolated in step 50 are subjected to further processing in step 70. In an embodiment of the illustrative process, an organic acid lean fluid 55 that is produced from the isolation step 50 is further treated in step 80 for recycle 85 to the subsurface shale formation. An acid lean extractant 105 from step 75 is recycled and combined with organic extractant 75.

Figure 3:
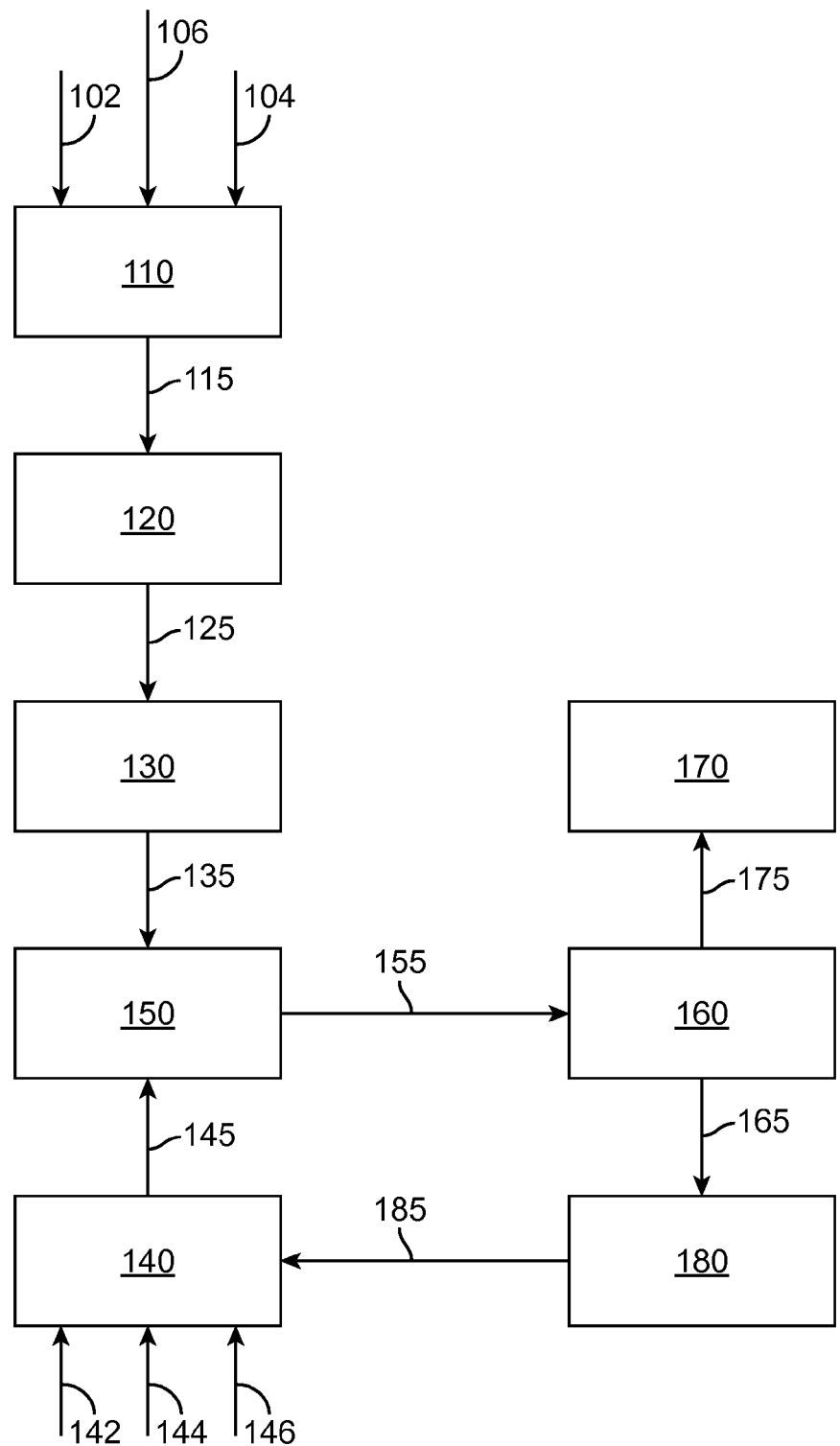
FIG. 3 is a block diagram illustrating an exemplary sequence of steps involving providing a reactive fluid to a subsurface shale formation that contains kerogen, providing an extractive fluid for mobilizing organic acids that are generated from kerogen reactions, recovering a mobile kerogen-based product from the formation and isolating organic acid products from the mobile kerogen-based product.

In an exemplary process illustrated in FIG. 3, a reactive fluid 115 is prepared in a preparation step 110 by mixing a first oxidant 102 with a carrier fluid 104, which may be aqueous or organic. Mixing devices for mixing the first oxidant with the carrier fluid to make the reactive fluid are well known. In one embodiment, the first oxidant that is used is effective for reacting with kerogen in an alkaline medium; under these conditions the fluid may optionally be mixed with an alkaline material 106 to result in a fluid having a pH of at least 7.

The reactive fluid mixture 115 is passed to the kerogen in the subsurface shale formation in step 120 via a first (e.g., injection) well that has been drilled to penetrate the subsurface formation to provide access to the kerogen within the formation. The reactive fluid combines with a fluid already present to form a formation fluid 125, in contact with the kerogen. In one embodiment, the subsurface shale formation has been fractured to enhance the permeability of the shale to the formation fluid and to increase the accessibility of the kerogen component to this fluid. In step 130, the first oxidant reacts with the kerogen to form organic acids 135.

An extractive fluid 145 is prepared in preparation step 140 by mixing an alkaline material 142 with an aqueous carrier fluid 144 and optionally with a surfactant 146. The extractive fluid 145 is combined into the formation fluid in step 150 for mobilizing the organic acids and to form the mobile kerogen-based product 155, which is recovered. The mobile kerogen-based product 155 is treated in 160 to isolate organic acids 175, which may be further processed in 170.

Isolating the organic acids further produces an organic acid lean fluid 165, containing a reduced amount of organic acids. This fluid is prepared for return to the formation as a recycle fluid 185. Prior to recycling, the organic acid lean fluid may be conditioned in step 180 for recycling to the formation. Typical conditioning steps include, for example, removing inorganic salts, removing at least a portion of the remaining organic acids, including $C_1$ to $C_{10}$ organic acids, and removing other organic material from the fluid.

During some applications of the process, it may be desirable to contact kerogen in the subsurface shale with multiple formation fluid treatments. With each treatment, an oxidant or a reactive fluid containing the oxidant is provided to the kerogen, for contacting the kerogen for a time sufficient to reduce the amount of oxidant to a target low level. Generally, at least 10 wt. % of the oxidant is consumed during each treatment. In one embodiment, at least 30 wt. %; in another embodiment at least 50 wt. %; in another embodiment at least 70 wt. % of the first oxidant is consumed during each treatment. At a target condition set by the process (e.g. amount of the first oxidant in contact with the kerogen, extent of kerogen conversion, quality of the reaction products being produced), the second oxidant is provided to the kerogen to regenerate the first oxidant. In one embodiment, the cycle of oxidizing the kerogen with the first oxidant and regenerating the first oxidant with the second oxidant occurs multiple times before the mobile kerogen-based product is recovered and processed. In a second embodiment, a cycle of oxidizing the kerogen with the first oxidant, regenerating the first oxidant with the second oxidant and recovering the mobile kerogen-based product is repeated multiple times. In a third embodiment, the second oxidant is supplied continuously to the kerogen to maintain the first oxidant, in contact with the kerogen, at a desired chemical activity level.

Generally, at least 30 wt. % of the kerogen is converted during the multiple treatment process. In one embodiment, at least 50 wt. %, or at least 60 wt. %, or at least 70 wt. % of the kerogen is converted during the multiple treatment process.

In one embodiment, the process for extracting a kerogen-based product includes causing the mobile kerogen-based product to flow through the subsurface shale formation and to a second (e.g., production) well that has been drilled to penetrate the subsurface formation to withdraw fluids from the formation. The formation fluid in contact with the kerogen causes some of the kerogen to react and form mobile reaction products, which are recovered from the subsurface shale to surface facilities for isolation and recovery of the mobile reaction products. In one embodiment, at least a portion of the mobile reaction products are absorbed by the formation fluid and the resulting mobile kerogen-based product is recovered from the subsurface shale formation.

In one embodiment, the reactive fluid is caused to flow into the subsurface shale formation from the injection well until a target pressure higher than formation pressure is reached within the formation. The flow of the reactive fluid is then slowed or stopped and the resultant formation fluid mixture is maintained in contact with the kerogen, while converting kerogen in the subsurface shale to a mobile kerogen-based product and producing an oxidant-depleted formation fluid. Generally, at least a portion of the formation fluid mixture is removed from the kerogen when, for example, the reactivity of the formation fluid is depleted below a target amount, or the pH of the formation fluid has changed beyond a target pH range, or the amount of reaction products from kerogen conversion which has been absorbed by the formation fluid has met or exceeded a target amount. In one embodiment, the mobile kerogen-based product is at least partially removed from the subsurface shale by reducing the pressure on the shale and permitting the formation fluid to flow into a well for removal to the surface. In one embodiment, the mobile kerogen-based product is at least partially removed by displacement with additional reactive fluid added to the formation through an injection well.

In one embodiment, oxidant is maintained in contact with the kerogen until a target amount of mobile reaction products are produced and/or are absorbed into the formation fluid. Progress toward reaching the target amount may be monitored, for example, by withdrawing the fluids to the surface for analysis, by analyzing the fluids in the subsurface shale formation, or by analyzing the fluids in a well extending into the formation. In one embodiment, the formation fluid is maintained in contact with the kerogen up to a target kerogen conversion. In one such embodiment, the formation fluid is maintained in contact with the kerogen until at least 10 wt. %; or at least 30 wt. %; or at least 50 wt. %; or at least 60 wt. %; or at least 70 wt. %; or even at least 80 wt. % of the kerogen is converted to mobile reaction products. In one embodiment, the formation fluid is maintained in contact with the kerogen for a time sufficient to reduce the concentration of the oxidant to a target value. Reducing oxidant concentration to low levels during reaction facilitates the formation of high amounts of large mobile kerogen fragments and the formation of low amounts of $CO_2$ during reaction of the kerogen. For example, less than 15 wt. %; or less than 10 wt. %; or less than 5 wt. % of the kerogen is converted to $CO_2$ during reaction with the formation fluid. In one such embodiment, the target value with respect to the oxidant concentration in the formation fluid is less than 10 wt. %; or less than 7 wt. %; or less than 5 wt. %; or in the range from 0.01 wt. % to 5 wt. % of the oxidant concentration of the formation fluid following addition of oxidant to the formation fluid. In one embodiment, the formation fluid is maintained in contact with the kerogen for a period of greater than 1 hour; or in another embodiment for a period of greater than 4 hours. In another embodiment, the formation fluid is maintained in contact with the kerogen for a period in the range from 1 hour to 45 days; in another embodiment from 10 hours to 20 days; in another embodiment from 1 day to 7 days, in order to reduce the concentration of the oxidant to a target value in the spent formation fluid.

The process may further include monitoring the extent of reaction of the kerogen. For example, a fluid sample, such as the formation fluid, may be removed from the subsurface shale formation and analyzed for the oxidant component. Alternatively, the progress of the reaction may be monitored using a downhole analyzer to determine the concentration of the oxidant component in the formation fluid. An analyzer suited to determining a quantity of the oxidant may be inserted into, or intimately contacted with the fluids in the subsurface shale formation.

In other embodiments, the process further comprises monitoring the kerogen conversion using the amount of mobile reaction products in the subsurface shale formation. As with the oxidant reactive component described above, the amount of mobile reaction products may be determined from an analysis of fluids recovered from the formation, or from a downhole analysis tool suited for analyzing the amount of reaction products.

A variation (i.e., alternate embodiment) on the above-described process is the application of some or part of such above-described methods to alternative sources, i.e., low-permeability hydrocarbon-bearing (e.g., oil and gas) formations, in situ coal, in situ heavy oil, in situ oil sands, and the like. General applicability of at least some of the above-described invention embodiments to any hydrocarbon-bearing formation exists. Surface processing applications may include upgrading of oil shale, coal, heavy oil, oil sands, and other conventional oils with asphaltenes, sulfur, nitrogen, etc.

EXAMPLE

This example illustrates the effectiveness of potassium permanganate for producing high molecular weight organic acids in reactions with kerogen.

Kerogen was separated from a sample of oil shale that contained kerogen. The separated kerogen was largely organic matter, with a small amount of inorganic matter remaining from the inorganic substrate in which the kerogen originated. For this example, 2.50 grams of kerogen (organic matter basis) was combined with a solution containing 0.5 g $KMnO_4$ in 100 ml of 1% KOH solution. The kerogen/$KMnO_4$ mixture was stirred at 75° C. until the solution had lost its color, with no visual evidence of the purple permanganate color remaining. In general, this reaction took several hours, and up to 12 hours in some cases. The kerogen was then allowed to settle, and was separated from the solution. The kerogen was then rinsed with two 75 ml aliquots of 1% KOH solution. The two rinse solutions were set aside. The rinsed kerogen was then contacted with another aliquot of KMnO4 solution, and the oxidation and washing steps were repeated. After five successive KMnO₄ treatments, the kerogen was washed with oxalic acid solution at low pH to dissolve MnO₂ which was deposited on the kerogen surface. The kerogen was then rinsed before the next KMnO₄ treatment step. At the end of 17 KMnO₄ treatments, the kerogen was effectively consumed, and the permanganate color of the solution no longer disappeared. All of the 1% KOH rinse solutions collected from each treatment step were combined and acidified to pH 2.0. High molecular weight acids in the acidified solution precipitated from solution and were recovered. Low molecular weight acids in the solution were extracted with methyl t-butyl ether and recovered by removing the ether solvent.

Figure 4:
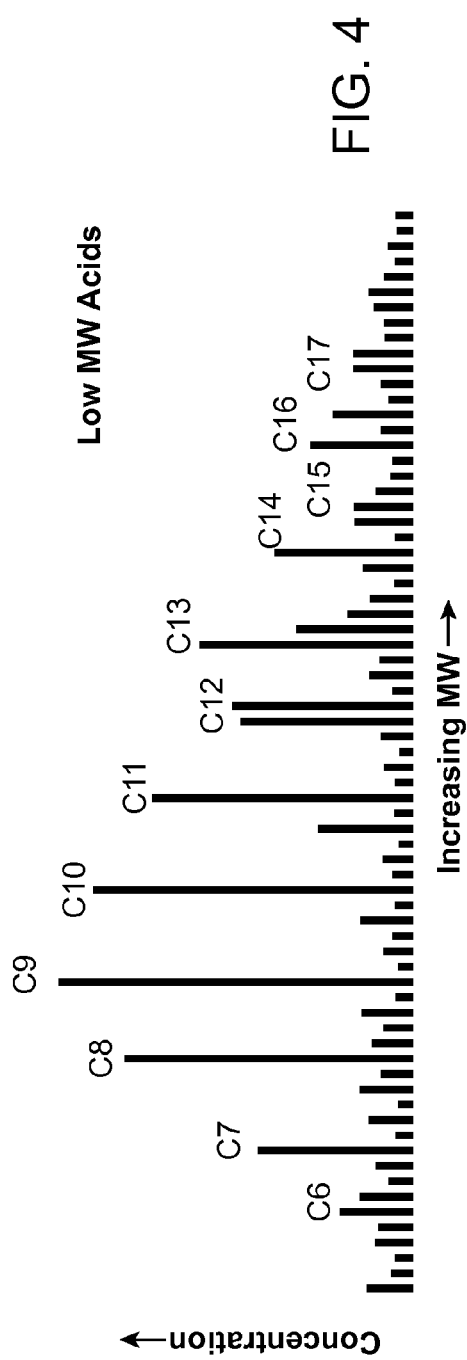
FIG. 4 illustrates carbon chain-size distribution of low molecular weight acids in kerogen permanganate oxidation products determined by gas chromatography/mass spectrometry.

FIG. 4 illustrates the gas chromatographic separation of the low molecular weight acids. A high proportion of the low molecular weight (i.e., $C_{35}-$) organic acids are in the $C_8$ to $C_{12}$ range. In particular, FIG. 4 shows carbon chain-size distribution of low molecular weight organic acids (di-carboxylic acids and mono-carboxylic acids) in kerogen permanganate oxidation products determined by gas chromatography—mass spectrometry (GCMS) of their silyl derivatives. The high-pH aqueous reaction product solution was adjusted to ~pH 2 and extracted with methyl t-butyl ether solvent to yield low molecular weight organic acids upon solvent removal. GCMS analysis showed these organic acids contain primarily straight (un-branched) alkyl chains. Hydroprocessing of this low molecular weight organic acids product to remove oxygen and other heteroatoms would provide the alkane mixture shown in the figure, where the number of carbon atoms in each of the major, straight-chain product peaks is labeled. The carbon number distribution of products range from $\sim C_6$ to $\sim C_{17}$ (with a maximum at $C_9$), covering the highly desirable gasoline, jet, and diesel transportation fuel hydrocarbon molecular weight range.

Figure 5:
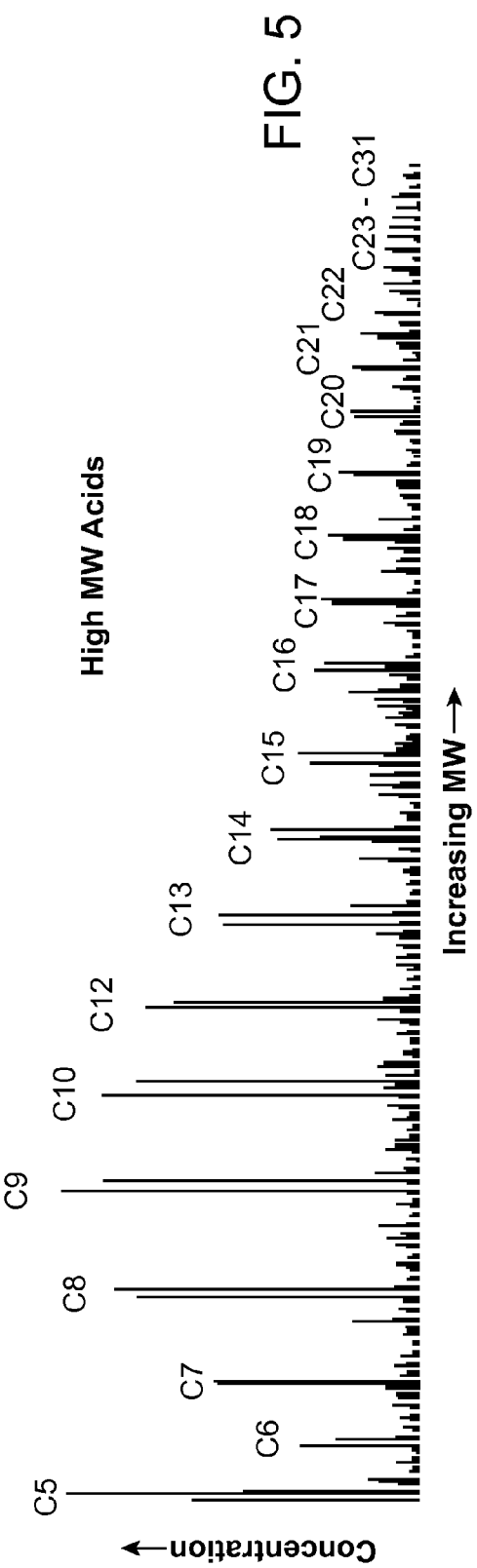
FIG. 5 illustrates carbon chain-size distribution of hydrocarbon products formed by pyrolysis of high molecular weight organic acids in kerogen permanganate oxidation products determined by pyrolysis gas chromatography/mass spectrometry.

The high molecular weight (i.e., $C_{35}+$) organic acids were passed through a pyrolysis gas chromatograph, which thermally pyrolyzed the acids. FIG. 5 is a gas chromatographic trace of the pyrolyzed acids. In particular, FIG. 5 shows carbon chain-size distribution of hydrocarbon products formed by pyrolysis of high molecular weight organic acids in kerogen permanganate oxidation products determined by pyrolysis gas chromatography—mass spectrometry (pyrolysis-GCMS). The high-pH aqueous reaction product solution was adjusted to ~pH 2 resulting in the precipitation of high molecular weight organic acids which were collected, washed with deionized water, and dried under vacuum. Pyrolysis-GCMS analysis showed these high molecular weight organic acids to yield primarily straight (un-branched) alkanes and alkenes upon heating to 500° C. in inert atmosphere. The number of carbon atoms in each of the major, straight-chain product peaks is labeled in the figure—each carbon number labels two peaks, consisting of an alkane and alkene pair, typical of pyrolysis/retort products. Hydroprocessing of the pyrolysis (retort) products shown in the figure, to remove alkenes and heteroatoms, would provide an alkane mixture with a carbon number distribution ranging from $\sim C_5$ to $\sim C_{31}$ (with a maximum at $C_9$), covering the highly desirable gasoline, jet, and diesel fuel hydrocarbon molecular weight range, with a small proportion of product in the fuel oil and lube oil hydrocarbon molecular weight range.

It is interesting to note that the profile of the pyrolyzed acids is very similar to the profile of the low molecular weight acids. In particular, a high proportion of the pyrolyzed organic acids are also in the $C_8$ to $C_{12}$ range.

Various modifications and alterations of this invention will become apparent to those skilled in the art without departing from the scope and spirit of the invention. Other objects and advantages will become apparent to those skilled in the art from a review of the preceding description.

What is claimed is:

1. 1. A process for extracting a kerogen-based product from a subsurface shale formation comprising subsurface shale, the process comprising the steps of:
   providing a first oxidant to kerogen in subsurface shale;
   contacting the kerogen in the subsurface shale with the first oxidant at a temperature in the range from 0° C. and 200° C. to form organic acids;
   mobilizing at least a portion of the organic acids from the subsurface shale to produce a mobile kerogen-based product; and
   regenerating the first oxidant in the subsurface shale, wherein the first oxidant is a permanganate oxidant.

2. The process according to claim 1, further comprising providing the first oxidant to the kerogen combined with a carrier fluid selected from the group consisting of an aqueous fluid, an ethanol fluid or combinations thereof.

3. The process according to claim 2, wherein the carrier fluid contains in the range from 0.1 wt. % to 40 wt. % of the first oxidant.

4. The process according to claim 2, wherein the carrier fluid has a pH in the range from 7 to 14.

5. The process according to claim 1, wherein the permanganate oxidant is provided to the kerogen in aqueous solution that contains in the range from 0.1 wt. % to 40 wt. % permanganate, expressed in terms of the weight of anhydrous permanganate salt dissolved in the solution.

6. The process according to claim 1, wherein the permanganate oxidant is selected from the group consisting of ammonium permanganate, $NH_4MnO_4$; calcium permanganate, $Ca(MnO_4)_2$; potassium permanganate, $KMnO_4$; and sodium permanganate, $NaMnO_4$.

7. The process according to claim 1, further comprising providing the first oxidant to the kerogen at a pH in a range from 7 to 14.

8. The process according to claim 7, further comprising maintaining the pH in the range from 7 to 14 by providing an alkaline material selected from the group consisting of a carbonate, a bicarbonate, an oxide and a hydroxide to the subsurface shale.

9. The process according to claim 7, further comprising providing the first oxidant to the kerogen at a pH in a range from 7 to 9.

10. The process according to claim 1, further comprising contacting the kerogen with the first oxidant for a period of at least 4 hours.

11. The process according to claim 1, wherein the step of regenerating the first oxidant further comprises the steps of:
   providing a second oxidant to the subsurface shale; and
   regenerating the first oxidant in the subsurface shale with the second oxidant.

12. The process according to claim 11, further comprising providing the second oxidant to the kerogen in a carrier fluid selected from the group consisting of an aqueous fluid, an ethanol fluid, or combinations thereof.

13. The process according to claim 11, further comprising providing the second oxidant to the kerogen as a gaseous oxidant.

14. The process according to claim 11, wherein the second oxidant is selected from the group consisting of peroxides, ozone and oxygen.

15. The process according to claim 11 further comprising providing the second oxidant at a temperature in a range from 0° C. to 200° C.

16. The process according to claim 11, further comprising providing the second oxidant to the subsurface shale for a time of at least 4 hours.

17. The process according to claim 1, further comprising regenerating the first oxidant at a pH in a range from 6 to 8.

18. The process according to claim 17, further comprising maintaining the pH in the range from 6 to 8 by supplying an alkaline material selected from the group consisting of a carbonate, a bicarbonate, an oxide and a hydroxide to the subsurface shale.

19. The process according to claim 17, further comprising maintaining the pH in the range from 6 to 8 by supplying an acidic material selected from the group consisting of a mineral acid, an organic acid, and combinations thereof to the subsurface shale.

20. The process according to claim 17, further comprising maintaining the pH in the range from 6 to 8 by supplying $CO_2$ to the subsurface shale.

21. The process according to claim 1, further comprising mobilizing at least a portion of the organic acids at a pH in the range from 7 to 14.

22. The process according to claim 21, further comprising mobilizing at least a portion of the organic acids at a pH in the range from 12 to 14, in the presence of alkaline material selected from the group consisting of a carbonate, a bicarbonate, an oxide and a hydroxide.

23. The process according to claim 1, wherein the mobile kerogen-based product contains $C_{35-}$ organic acids and $C_{35+}$ organic acids.

24. The process according to claim 23, wherein at least 50 wt. % of the organic acids in the mobile kerogen-based product are in the $C_{35+}$ range.

25. The process according to claim 23, wherein at least 20 wt. % of the $C_{35+}$ organic acids in the mobile kerogen-based product have a molecular mass number of greater than 1000 daltons.

26. The process according to claim 23, wherein at least 20 wt. % of the $C_{35-}$ organic acids in the mobile kerogen-based product are in the $C_8$ to $C_{12}$ range.

27. The process according to claim 1, wherein the mobile kerogen-based product contains in the range from 5 wt. % to 50 wt. % organic acids.

28. The process according to claim 1, wherein at least 30 wt. % of the organic acids in the mobile kerogen-based product are diacids.

29. The process according to claim 1, further comprising contacting the kerogen in the subsurface shale with a permanganate oxidant to form organic acids and manganese oxides, including one or more of $MnO_2$, $Mn_2^{2+}$, or $MnO_4^{2-}$.

30. The process according to claim 29, wherein the permanganate oxidant is selected from the group consisting of ammonium permanganate, $NH_4MnO_4$; calcium permanganate, $Ca(MnO_4)_2$; potassium permanganate, $KMnO_4$; and sodium permanganate, $NaMnO_4$.

31. The process according to claim 29, further comprising providing a second oxidant, other than permanganate, to the subsurface shale, to regenerate at least a portion of the manganese oxides to permanganate.

32. The process according to claim 29, wherein the second oxidant is selected from the group consisting of peroxides, ozone and oxygen.

33. A process for extracting a kerogen-based product from a subsurface shale formation comprising subsurface shale, the process comprising the steps of:
providing a first oxidant to kerogen in subsurface shale;
contacting the kerogen in the subsurface shale with the first oxidant at a temperature in the range from 0° C. and 200° C. to form organic acids;
mobilizing at least a portion of the organic acids from the subsurface shale to produce a mobile kerogen-based product;
recovering the mobile kerogen-based product comprising the organic acids; and
regenerating the first oxidant in the subsurface shale.

34. A process for extracting a kerogen-based product from a subsurface shale formation comprising subsurface shale, the process comprising the steps of:
providing a first oxidant to kerogen in subsurface shale;
contacting the kerogen in the subsurface shale with the first oxidant at a temperature in the range from 0° C. and 200° C. to form organic acids;
mobilizing at least a portion of the organic acids from the subsurface shale to produce a mobile kerogen-based product;
regenerating the first oxidant in the subsurface shale; and
recovering the mobile kerogen-based product comprising the organic acids.

35. A process for extracting a kerogen-based product from a subsurface shale formation comprising subsurface shale, the process comprising the steps of:
providing a first oxidant to kerogen in subsurface shale;
contacting the kerogen in the subsurface shale with the first oxidant at a temperature in the range from 0° C. and 200° C. to form organic acids;
providing a second oxidant to the kerogen in the subsurface shale to regenerate the first oxidant;
contacting the kerogen in the subsurface shale with the regenerated first oxidant for a period of at least 4 hours to form organic acids;
repeating the step of providing the second oxidant to the kerogen in the subsurface shale to regenerate the first oxidant at least once; and recovering a mobile kerogen-based product comprising the organic acids.

* * * * *